US00RE37503B1

(19) United States
(12) Reissued Patent
Aruga et al.

(10) Patent Number: US RE37,503 E
(45) Date of Reissued Patent: Jan. 8, 2002

(54) FLOPPY DISK DRIVE DEVICE

(75) Inventors: Tomoe Aruga; Hideya Yokouchi; Kazuyoshi Fujimori, all of Suwa (JP)

(73) Assignee: Seiko Epson Corporation, Tokyo (JP)

( * ) Notice: This patent is subject to a terminal disclaimer.

(21) Appl. No.: 09/046,132

(22) Filed: Mar. 23, 1998

Related U.S. Patent Documents

Reissue of:
(64) Patent No.: 5,610,782
Issued: Mar. 11, 1997
Appl. No.: 08/567,340
Filed: Nov. 17, 1995

U.S. Applications:

(63) Continuation of application No. 08/335,421, filed on Nov. 7, 1994, now Pat. No. 5,469,421, which is a continuation of application No. 07/915,044, filed on Jul. 16, 1992, now abandoned, which is a continuation of application No. 07/474,123, filed on Jul. 5, 1990, now abandoned.

(30) Foreign Application Priority Data

| | | |
|---|---|---|
| Sep. 5, 1988 | (JP) | 63-221864 |
| Feb. 2, 1989 | (JP) | 1-24647 |
| Feb. 2, 1989 | (WO) | PCT/JP89/00906 |
| May 15, 1989 | (JP) | 1-120727 |
| May 15, 1989 | (JP) | 1-120728 |
| Jul. 28, 1989 | (JP) | 1-195871 |
| Jul. 28, 1989 | (JP) | 1-195874 |
| Aug. 29, 1989 | (JP) | 1-222040 |

(51) Int. Cl.[7] ..... G11B 5/016
(52) U.S. Cl. ..... 360/99.05; 360/99.04; 369/270; 369/271
(58) Field of Search ..... 360/99.05, 99.02, 360/98.08, 99.04, 99.12; 369/270, 271

(56) References Cited

U.S. PATENT DOCUMENTS

| | | | | |
|---|---|---|---|---|
| 4,697,216 A | * | 9/1987 | Tsukahara | 369/271 |
| 4,700,251 A | | 10/1987 | Fuke et al. | 360/106 |
| 4,707,819 A | * | 11/1987 | Ehara | 369/77.2 |
| 4,717,978 A | | 1/1988 | Ichinose | 360/106 |
| 4,748,738 A | | 6/1988 | Nayar | 29/732 |

(List continued on next page.)

FOREIGN PATENT DOCUMENTS

| | | |
|---|---|---|
| EP | 0427490 A2 | 5/1991 |
| JP | 59-90202 | 4/1984 |
| JP | 59-107792 | 7/1984 |
| JP | U-60-44476 | 3/1985 |
| JP | U-60-111592 | 7/1985 |
| JP | 60-194503 | 10/1985 |

(List continued on next page.)

*Primary Examiner*—Tan T. Nguyen
(74) *Attorney, Agent, or Firm*—Oliff & Berridge PLC

(57) ABSTRACT

There are disclosed recording/reproducing devices for use with computers and particularly for recording or reproducing desired information on or from recording mediums like floppy disks, the devices being miniaturized and reduced in thickness for adapting themselves to the miniaturized computers of nowadays. The reduction in device thickness involves the use of a small-sized rare earth group magnet and neodymium ferrous boron which have good magnetic properties as rotor magnets of disk and carriage driving motors; or alternatively planar superpositions are avoided when placing the disk driving motor and the carriage or a carriage guide shaft and a circuit board. The thinned recording/reproducing devices contribute to diminishment of a space for accommodating the computer to meet a demand for miniaturization thereof. A plurality of miniaturized recording/reproducing devices of the invention can be set in the existing space for placement.

58 Claims, 29 Drawing Sheets

U.S. PATENT DOCUMENTS

| | | | | | |
|---|---|---|---|---|---|
| 4,772,974 | A | | 9/1988 | Moon et al. | 360/78.04 |
| 4,805,052 | A | * | 2/1989 | Nishijima | 360/97.01 |
| 4,809,106 | A | | 2/1989 | Inoue | 360/106 |
| 4,825,314 | A | | 4/1989 | Maekawa et al. | 360/97.08 |
| 4,870,518 | A | | 9/1989 | Thompson et al. | 360/97.01 |
| 4,901,173 | A | | 2/1990 | Jones et al. | 360/97.01 |
| 4,908,793 | A | | 3/1990 | Yamagata et al. | 369/75.1 |
| 4,930,029 | A | | 5/1990 | Morita | 360/97.01 |
| 4,965,684 | A | | 10/1990 | StefanSky | 369/75.1 |
| 5,025,336 | A | | 6/1991 | Morehouse et al. | 360/97.01 |
| 5,062,019 | A | | 10/1991 | Morisawa | 360/106 |
| 5,461,523 | A | | 10/1995 | Hosni | 360/270 |
| 5,469,421 | A | | 11/1995 | Aruga et al. | 369/75.1 |

FOREIGN PATENT DOCUMENTS

| | | |
|---|---|---|
| JP | U-60-190162 | 12/1985 |
| JP | A-61-9866 | 1/1986 |
| JP | U-61-13359 | 1/1986 |
| JP | 61-20260 | 1/1986 |
| JP | U-61-79860 | 5/1986 |
| JP | U-61-98269 | 6/1986 |
| JP | U-61-123680 | 8/1986 |
| JP | 62-42152 | 3/1987 |
| JP | 62-150577 | 4/1987 |
| JP | 62-164847 | 7/1987 |
| JP | U-63-10761 | 1/1988 |
| JP | A63-39169 | 2/1988 |
| JP | U-63-47445 | 3/1988 |
| JP | A-63-90058 | 4/1988 |
| JP | U-63-105948 | 7/1988 |
| JP | U-1-59976 | 4/1989 |
| JP | A-3-25749 | 2/1991 |

* cited by examiner

FIG. 4
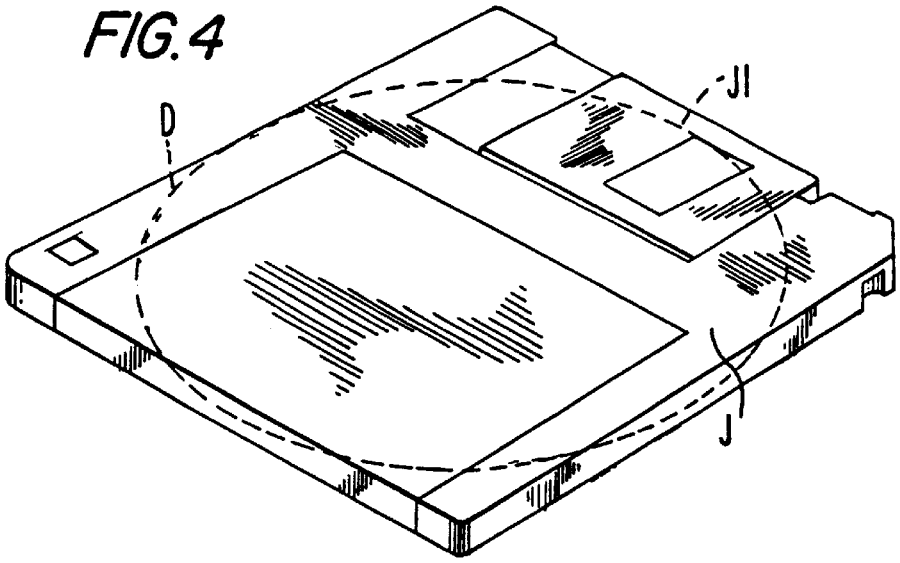
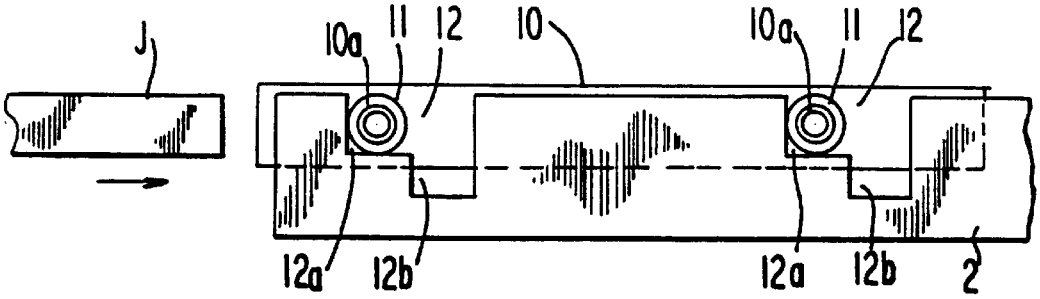
FIG. 5
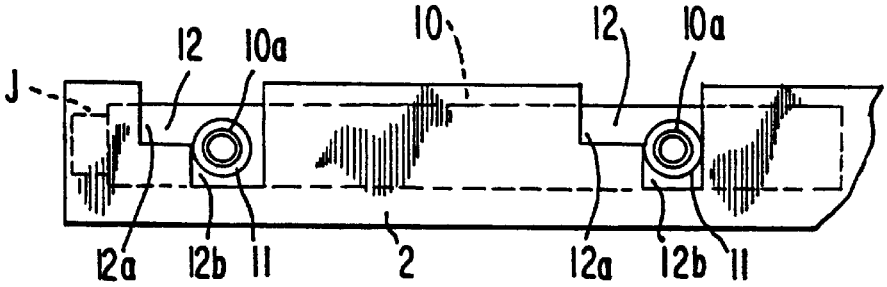
FIG. 6

10
10c
10e
15
15a
15c
16
17
30
30a
30b
30c
31
31a
32
33
40
41
41a
J

FIG. 31 - Amended

PRIOR ART
FIG. 38 Amended
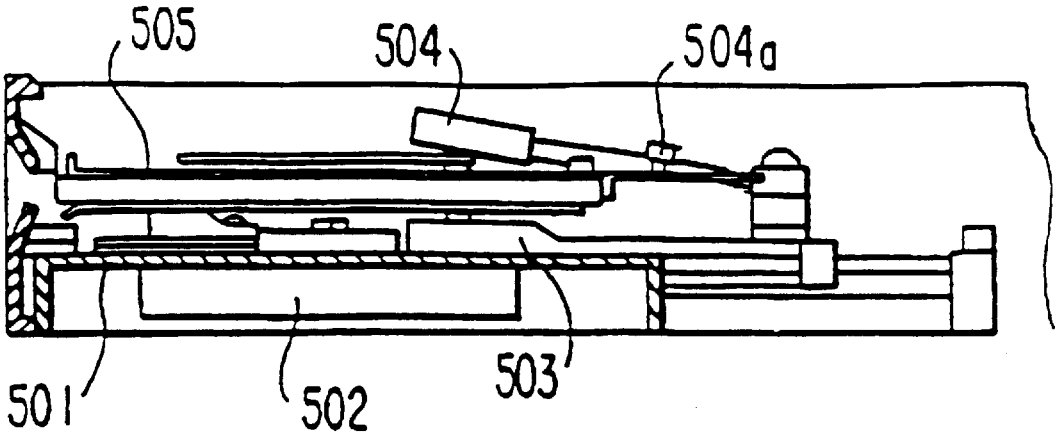
PRIOR ART
FIG. 39 Amended
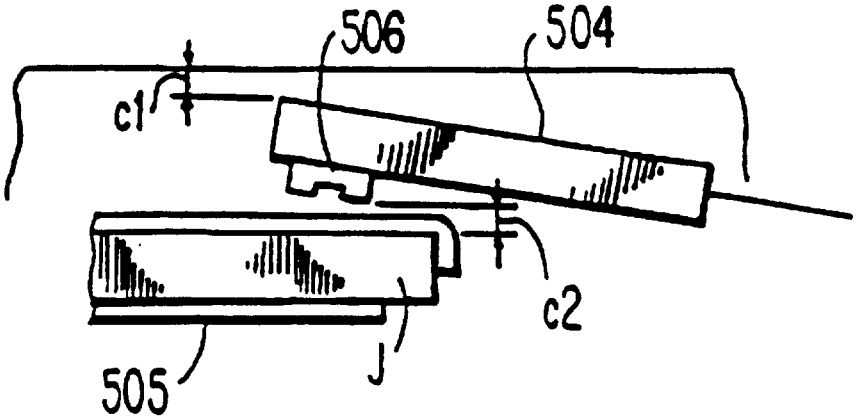

PRIOR ART
FIG. 40 Amended
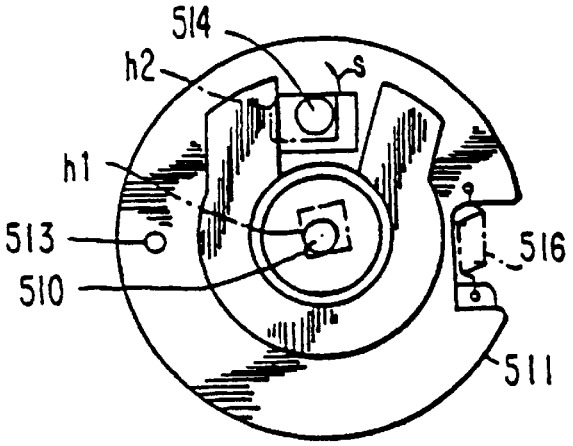
PRIOR ART
FIG. 41 Amended
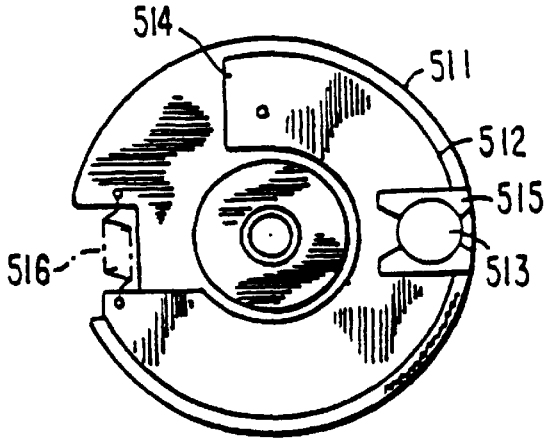
PRIOR ART
FIG. 42 Amended
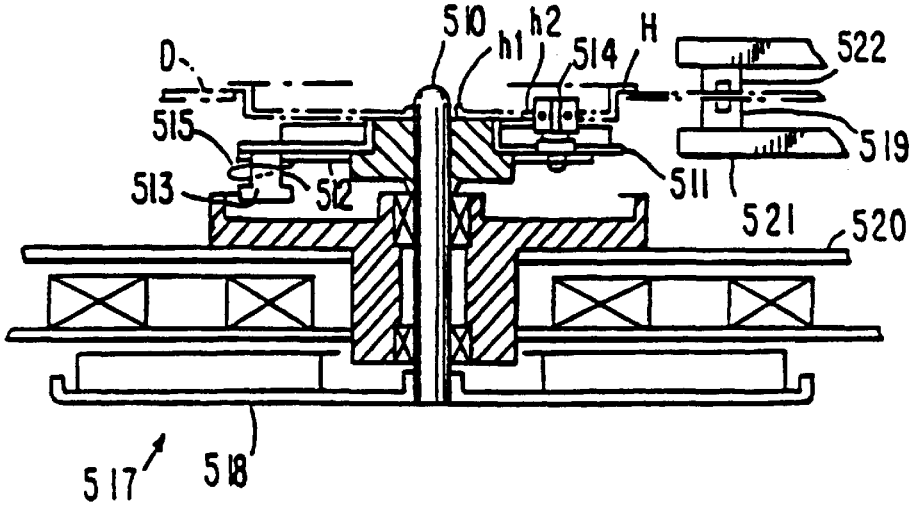

PRIOR ART
FIG. 43 Amended
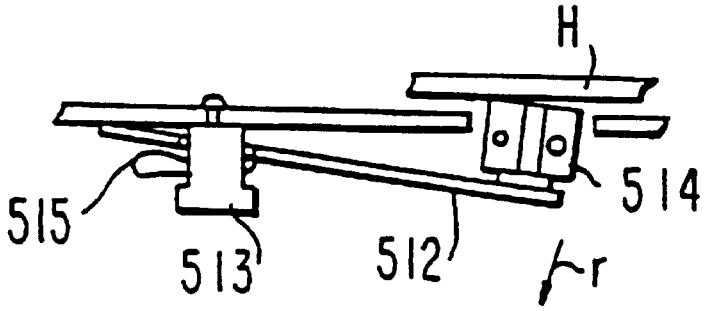
PRIOR ART
FIG. 44 Amended
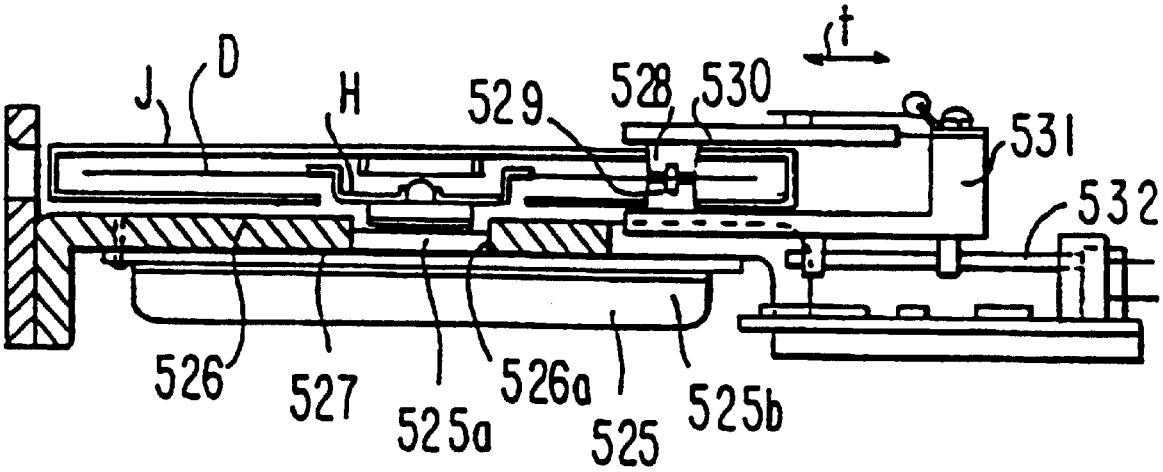

PRIOR ART
FIG.45 Amended
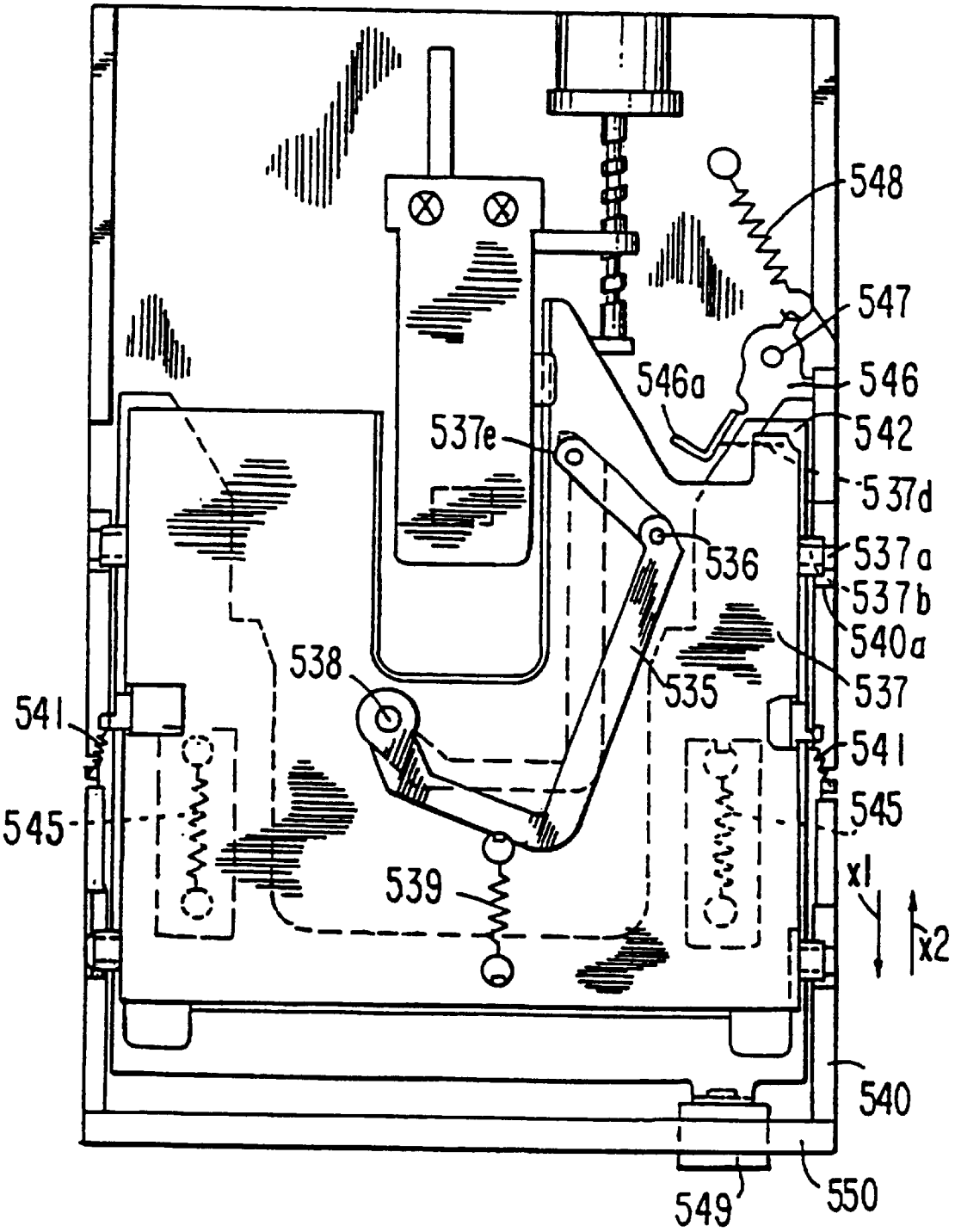

PRIOR ART
FIG. 46 Amended
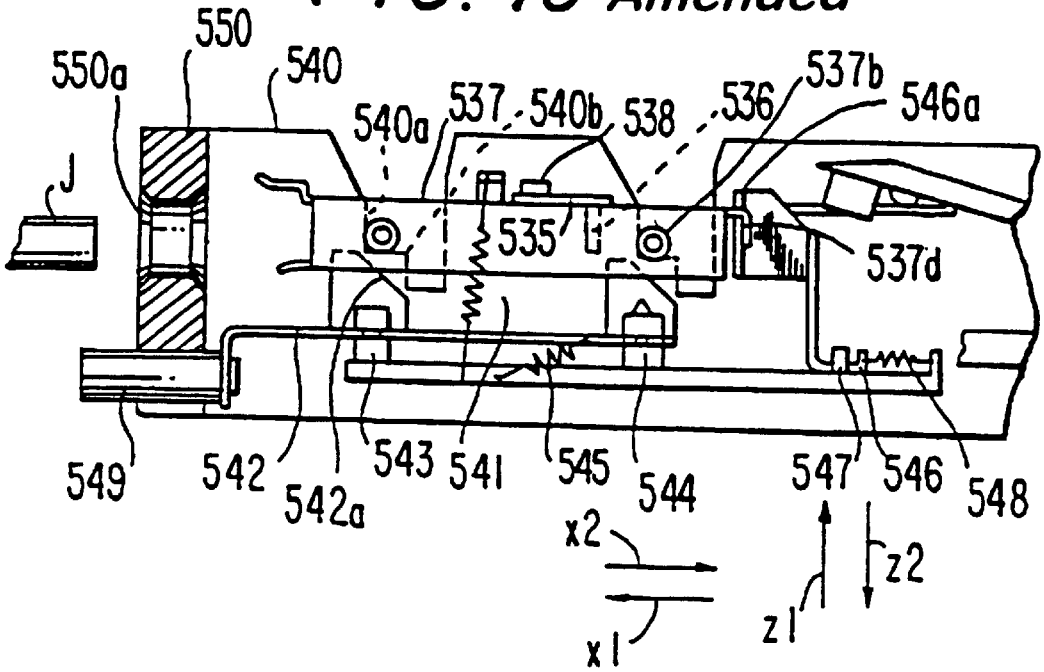
PRIOR ART
FIG. 47 Amended
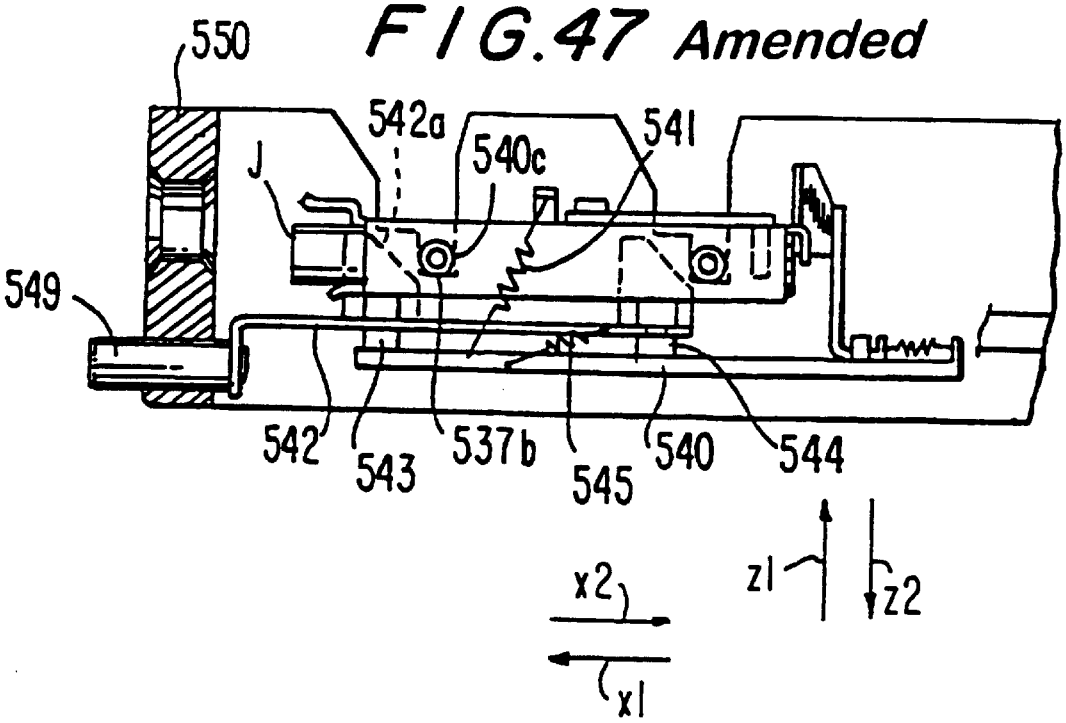

PRIOR ART
FIG. 48 Amended
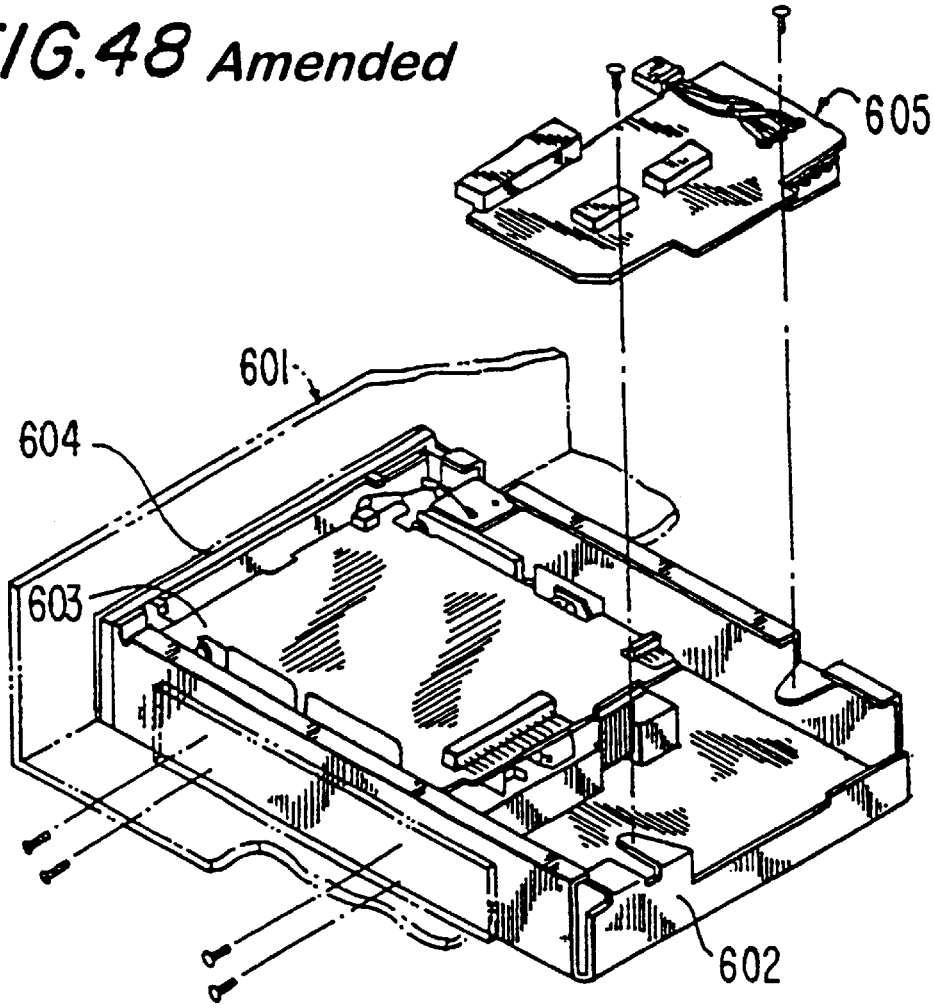
PRIOR ART
FIG. 49 Amended
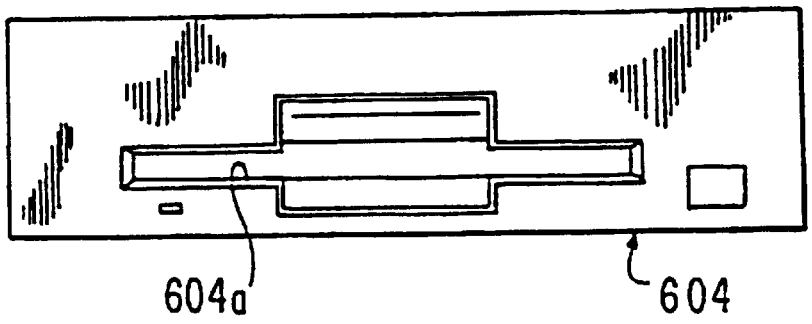

FLOPPY DISK DRIVE DEVICE

Matter enclosed in heavy brackets [ ] appears in the original patent but forms no part of this reissue specification; matter printed in italics indicates the additions made by reissue.

[This is a continuation of application Ser. No. 08/335,421 filed on Nov. 7, 1994, now U.S. Pat. No. 5,469,421 which is a continuation of application Serial No. 07/915,044, filed Jul. 16, 1992, abandoned which is a continuation of application Ser. No. 07/474,123, filed Jul. 5, 1990, for FLOPPY DISK DRIVE DEVICE, now abandoned.]*This is one of seven (7) reissue applications directed to various distinct and separate parts of the floppy disk drive described in U.S. Pat. No. 5,610,782, which corresponds to U.S. Ser. No. 08/567,340, which is a continuation of U.S. Ser. No. 08/335, 421 filed on Nov. 7, 1994, now U.S. Pat. No. 5,469,421, which is a continuation of U.S. Ser. No. 07/915,044 filed on Jul. 16, 1992 abandoned, which is a continuation of U.S. Ser. No. 07/474,123 filed Jul. 5, 1990, abandoned. Each of the reissue applications was filed on Mar. 23, 1998 and is entitled "FLOPPY DISK DRIVE". The U.S. application Ser. Nos. for the seven (7) reissue applications are as follows: 09/045,931, 09/045,901 now abandoned, 09/045,932 now abandoned, 09/046,132, 09/046,133, 09/046,131 now abandoned and 09/046,130.*

TECHNICAL FIELD

The present invention is directed generally to a recording/reproducing device for use with, e.g., a computer and a word processor, and more particularly, to a recording/reproducing device for recording or reproducing pieces of desired information on or from a recording medium such as a floppy disk.

BACKGROUND ARTS

A typical arrangement of this type of recording/reproducing device is that a frame of an apparatus body accommodates a disk driving motor, a carriage having upper and lower heads, a carriage driving motor for moving the carriage and a circuit board incorporating a circuit for controlling operations of the motor and a [lead light] *read/write head*; and the recording medium is loaded into the device to effect recording or reproducing. In recent years, it is desired that the recording/reproducing device be small both in configuration and in thickness with an increasing demand for miniaturizing the computers.

A prior art recording/reproducing device disclosed in Japanese Utility Model Laid-Open Publication No. 62-147197 is illustrated in FIGS. 38 and 39. FIG. 38 is a vertical sectional side view of the prior art recording/reproducing device. FIG. 39 is an enlarged view depicting the principal portion thereof.

As illustrated in the Figures, a spindle motor 502 serving as a motor for driving the carriage is mounted from underside of a frame 501 in the Figures. Disposed on an upper surface of the spindle motor 502 is a lower carriage 503 fitted with a lower head, on which an upper carriage 504 having an upper head [508] *506* is mounted about a rotary fulcrum. A jacket is held between the lower and upper carriages 503 and 504. Provided on the recording/reproducing device is a holder 505 which moves between a position in which to insert a jacket J and a recording/reproducing position. The upper carriage 504 mounted with the upper head includes a lift member 504a to separate the upper carriage 504 from the jacket J in linkage with a motion of the holder 505 moving between the inserting position of the jacket J and the recording/reproducing position.

For this purpose, in the recording/reproducing device catered for, e.g., a recently developed lap-top computer, as the above-mentioned demand for decreasing a thickness of the device grows, it is required to reduce both a clearance cl between the upper carriage 504 depicted in FIG. 39 and an outer circumference of the recording/reproducing device and a clearance c2 between the upper head 506 and the jacket J. Based on the prior arts, however, an amount of movement of the upper carriage 504 is determined by a lifting/lowering quantity of the holder 505. The upper carriage 504 is constructed to rotate about a fitting part to the lower carriage 503, and hence a scatter with respect to the lifting member 504a of the upper carriage 504 is expanded several times in a position of the upper head 506 at the top of the upper carriage 504. When making an attempt to enlarge the clearance c2 between the jacket J and the upper head [508] *506*, the upper carriage 504 grows in configuration in excess of predetermined dimensions of the recording/reproducing device; or reversely, when the priority is given to the dimensions of the recording/reproducing device, it is impossible to obtain a sufficient clearance c2 between the jacket J and the upper head [508] *506*. This situation leads to a problem in which the jacket J acts to damage the upper head 506.

A rotary driving mechanism for a disk in the above-mentioned recording/reproducing device is disclosed in, for instance, Japanese Utility Model Laid-Open Publication No. 61-52351. The construction thereof is depicted in FIGS. 40 through 43. Turning to FIG. 40, there is illustrated a plan view of a conventional disk rotary driving unit. FIG. 41 is a bottom view thereof. FIG. 42 is a vertical sectional view thereof. FIG. 43 is a sectional view schematically illustrating a driving pin part thereof.

In these Figures, the symbol D denotes a disk, and H represents a hub thereof. These components are drawn with dotted lines in [FIGS. 40 and 41] *FIG. 42*. The reference numeral 510 designates a rotary driving shaft of the disk D. A chucking lever 512 is pivotally supported about a fulcrum 513 on a rotary plate 511 rotating together with the driving shaft 510. A spring 515 imparts an axial bias to a driving pin 514 fitted to the chucking lever 512, while rotational bias is given by a spring 516. The chucking lever 512, when the hub H is set to be chucked, as illustrated in FIG. 43, escapes in an arrowed direction *r* in the Figure while being pushed by the hub H, so [far] *long* as a rotary driving hole h2 located eccentrically from the center of the hub H does not align in position with the driving pin 514. Next, as depicted in FIG. 42, the driving pin 514 rotates together with the rotary central shaft 510 by initiating rotations of a rotor 518 of a disk driving motor 517 mounted on an end of the rotary driving shaft 510. Just when the rotary driving hole h2 aligns with the driving pin 514, this pin 514 is protruded into the rotary driving hole h2 by dint of the spring 515. On the basis of a positional relationship of the driving pin 514 with respect to the fulcrum 513, as illustrated in FIG. 40, the driving pin 514, when rotating the hub H, generates a force acting in an arrowed direction s of the Figure and a force for rotating the hub H. The force in the arrowed direction s of the Figure acts to thrust two inner points of a central hole h1 of the hub H against the rotary driving shaft 510, thereby effecting a rotary drive while seeking the center of the hub H. The lower head 519 for recording and reproducing signals on and from the disk D is disposed between a frame 520 of the motor 517 and the disk D.

Based on this construction, according to the prior art discussed above, when trying to reduce the thickness of the recording/reproducing device, thicknesswise dimensions are conditional to a space for accommodating the rotor 518 of the motor 517, the lower carriage 521, the lower head 519 and the chucking mechanism. This is an obstacle against the reduction in thickness of the device.

In particular, as depicted in FIG. 43, the driving pin 514 is pushed by the hub H when chucking the hub H and is moved in the arrowed direction r in the Figure, resulting in provision of a futile space.

An additional example is a recording/reproducing device reported on Nikkei Electronics Journal, NO.394 issued in 1986 5—5. This recording/reproducing device is, as illustrated in FIG. 44, constructed such that a disk driving motor 525 is provided coaxially with the disk D defined as a recording medium, a bearing 525a of the motor 525 is fitted in a positioning hole 526a bored in a frame 526, and a motor base 527 is fixed to the frame 526 with [Screws] *screws*.

Upper and lower carriages 530 and 531 mounted with upper and lower heads 528 and 529 are guided by a guide shaft 532. Movement positioning in an arrowed direction [j] *t* of the Figure is effected by use of an unillustrated stepping motor conceived as a carriage driving motor. Attached to a lower surface of the guide shaft [582] *532* in the Figure is a circuit board for controlling the disc driving unit and converting signals transmitted from the heads.

Besides, the lower carriage [581] *531* is arranged to move up to an upper surface of the rotor 525b of the disk driving motor 525 in the Figure.

For this reason, in the case of decreasing the device thickness, it is necessary to make thin both the motor and the frame, because the disk driving motor is disposed downwardly of the frame. It is therefore difficult to reduce the device thickness. A further obstacle against the decrease in the device thickness is the arrangement that a control board is attached to a lower surface of the carriage. It is because the carriage is overlapped thicknesswise with the control board. The carriage is intruded up to an upper surface of the rotor of the disk driving motor, resulting in the difficulty of reducing the device thickness because of superposing the carriage thicknesswise on the rotor.

A loading/ejecting mechanism of the disk in the prior art recording/reproducing device is constructed in the following manner. FIG. 45 is a plan view schematically illustrating one example of the conventional recording/reproducing device. FIGS. [48] *46* and 47 are vertical sectional side views schematically depicting a standby state of loading a jacket accommodating the disk and a state of mounting the jacket.

Referring to these Figures, a shutter releasing lever 535 is provided at its one end with an operating pin [586] *536* for releasing a shutter (not shown) of the jacket by engaging with the shutter. The other end of the lever 535 is so fitted to a holder 537 for holding the jacket as to be [ratable] *rotatable* about a fulcrum pin 538. The lever 535 is constantly so biased as to be rotatable clockwise in FIG. 45. On a side surface of the holder 537, a plurality of rolling roller pins 537a serving as interlocking means are fixed to rolling rollers 537b to permit rotations of the rolling rollers 537b, the pins 537a being biased in an arrowed direction X1 by a holder spring 541 while engaging with holder guide grooves 540a of a frame 540. The roller pins 537a are positioned to permit impingement upon lifting/lowering cam portions 542a of a cam member 542 depicted in FIGS. 46 and 47. The cam member 542 is supported on a jacket guide receiving portion 543 conceived as a jacket supporting means embedded into the frame 540 and on a part of a jacket receiving pin 544 serving as a position regulating means. The cam member 542 is so disposed as to be slidable in arrowed directions x1 and x2 and is also biased in the arrowed direction x1 by a cam member spring 545. An eject member 546 depicted in FIG. 45 is axially supported on a shaft 547 embedded into the frame 540 and rotationally biased anticlockwise in FIG. 45 by means of an eject member spring 548. The eject member [548] *546* includes an impingement portion 546a which impinges upon a part of the jacket J. The jacket [K] *J*, when being inserted or pulled out, collides with the impingement portion [548a] *546a*, whereby the eject member [548] *546* rotates about the shaft 547.

Fixed to a part of the cam member 542 is an eject button 549 illustrated in FIGS. [48] *46* and 47 in close proximity to a dressing plate 550 attached to the frame 540.

Based on such a construction, as illustrated in FIG. 46, the jacket J is inserted from an insertion port 550a in the direction x2, in which state the operating pin 536 fixed to the shutter releasing lever 535 shown in FIG. 45 engages with the shutter of the jacket J. The shutter releasing lever 535 is thereby rotated about the fulcrum pin 538 in the anticlockwise direction of FIG. 45 while opening the shutter. Upon a further insertion of the jacket J in the arrowed direction x2 of FIG. 46, the jacket J impinges on the impingement portion 546a of the eject member 546, with the result that the eject member 546 starts rotating clockwise about the shaft 547 in FIG. 45 while resisting the biasing force of the eject member spring 548. When being further intruded, the jacket J abuts against an impingement portion 537d of the holder 537, thereby moving the holder 537 in the arrowed direction x2, resisting the biasing force of the holder spring 541. As shown in FIG. 46, the plurality of rolling rollers 537b provided on the side surface of the holder 537 are moved down along the guide groove 540 chased in the frame 540 in an arrowed direction z2 by means of the holder spring 541.

On the other hand, the jacket J inserted into the holder 537 is supportingly received by the jacket receiving pin 544 embedded into the frame 540 and by the jacket receiving portion [843] *543*, thus effecting a predetermined positioning process. Subsequently the jacket is seated as illustrated in FIG. 47, in which position recording and reproducing are to be performed.

Next, in the case of ejecting the jacket J, the eject button 549 is depressed in the direction x2 from a state of FIG. 47. Then, a lifting cam portion 542a of the cam member 542 impinges upon the rolling roller 537b of the holder 537, whereby the holder 537 holding the jacket J slides upwards along a holder guide groove 540c formed in the frame 540. Immediately, the eject member 546 is rotated anticlockwise in FIG. 45 by the biasing force of the eject member spring 548, and the jacket J is thereby ejected in the arrowed direction x1. At this time, the shutter releasing lever 535 is made to revert to a position indicated by a solid line of FIG. 45 by dint of a tensile coil spring 539, thus finishing an ejecting operation.

In the above-mentioned prior art jacket loading/ejecting mechanism, however, the cam member 542 guided by the guide pin embedded into the frame 540 slides in the jacket inserting/removing directions to thereby move the holder 537 horizontally to the jacket inserting/removing position and further to the recording/reproducing position. As a result, a load associated with rectilinear sliding of the cam member 542 becomes large, and the cam member 542 increases in configuration because of requiring guide pins 543 and 544 for guiding the holder 537 and also a support member for moving the holder while holding it horizontally. Besides, the cam member has to be disposed between the holder and the frame, resulting in a problem in terms of space.

If the jacket is mistakenly inserted, the jacket is intruded from the insertion port 550a of the dressing plate 550 of FIG. 46 in the arrowed direction X2 in such a state, for example, the surfaces or the front and the rear of the jacket are reversed. At this time, the operating pin 536 provided on the shutter releasing lever 535 impinges on the top end surface of the jacket J, thereby rotating the lever 535 anticlockwise in FIG. 45. When the insertion continues, the shutter releasing lever 535 is further rotated in the same direction and behaves to thrust forward the holder 537 while abutting against an impingement portion 537e of the holder 537. For this reason, the result is that the same fitting operations are carried out following a trajectory identical with that in the inserting process in the above-described normal state. Consequently, the components incorporated in the device are to be damaged. The cam member 542 is, as discussed above, supported on the jacket receiving portion 543 conceived as a jacket supporting means embedded into the frame 540 as well on a part of the jacket receiving pin 544 [defined] *defining* a position regulating means. The cam member 542 is so located as to be slidable in the arrowed directions X1 and x2 and includes the cam portion 542a on which the plurality of rolling rollers 537b provided, as depicted in FIG. [48,] *46* on the side surface of the holder 537 impinge. With this arrangement, when sliding the cam member 542, the sliding portion increases in area, and there are needed parts for guiding and holding the cam member 542. Provision of the cam member 542 entails formation of a gap between the frame 540 and the holder 537, and an additional problem is that the configuration becomes large because of the parallel movement of the holder 587.

As stated earlier, the conventional reproducing device presents a variety of obstacles against miniaturization of the device (reduction in the device thickness).

In a recording/reproducing device developed in recent years as an external storage unit of a variety of electronic appliances associated with computers, there are widely spread a floppy disk drive (hereinafter abbreviated to FDD)[. A] *, a* hard disk drive (abbreviated to HDD), an optical disk drive (abbreviated to ODD) and a tape streamer. Sizes of outer shapes and fitting dimensions thereof are substantially standardized depending on a size of the recording medium. Take the FDD for instance, typically three types of FDDs are available, i.e., a 3.5-inch type, [d] a 5.25-inch type (generally known as a 5-inch type and the representation is the same with this description) and [a] *an* 8-inch type. The recording medium used for a single unit of electronic appliance typically comes under one size, which causes inconvenience in terms of general purposes.

To cope with this, there was proposed a recording/reproducing device capable of recording and reproducing by employing both an initially used disk and another disk having a different size, the device being disclosed in, Japanese Utility Model Laid-Open Publication No.63-11792. The construction thereof is shown in FIGS. 48 and 49.

Turning first to FIG. 48, there is illustrated a perspective view of an outline of the conventional recording/reproducing device in an electronic appliance such as a computer. FIG. 49. is a front elevation thereof.

An arrangement of the recording/reproducing device, depicted in FIGS. 48 and 49, for use with the electronic appliance is given as follows. For example, a 3.5-inch standardized recording/reproducing device 603 in accordance with a recent tendency of miniaturization incorporated in a chassis 602 of an electronic appliance body 601, the chassis 602 having the same size and the same mounting structure as those of the chassis of the FDD (hereinafter referred to as a 5-inch standardized FDD) which is standardized corresponding to, e.g., an initially used 5-inch disk. Attached to a front surface of the chassis 602 is a front bezel 604 having much the same size as that of, e.g., a 5-inch FDD. The front bezel 604 is formed with an insertion port 604a for loading the inch disk. Provided in rear of the recording/reproducing device 603 is a relay board 605 exhibiting the same interface function as that of, e.g., the 5-inch FDD. In a variety of electronic appliances each mounted with, e.g., the 5-inch FDD and composed of a body 601 formed with an opening for admitting the front bezel, the recording/reproducing device is completely replaceable with the 5-inch FDD.

The above-mentioned type is, however, classified as, e.g., a 3.5-inch recording/reproducing device miniaturized smaller than the 5-inch FDD and having an interface function identical with that of the 5-inch FDD. For instance, in many kinds of electronic appliances each mounted with, e.g., 5-inch FDD, the recording/reproducing device is completely replaceable with the 5-inch FDD. Hence, when replacing the recording/reproducing device even in a system which has hitherto been utilized, software recorded on a 3.5-inch recording medium can be used instead of the software which *has* already been recorded on a 5-inch recording medium in the conventional system as it is. The initial purpose can thus be accomplished. There arise, however, the following defects in association with a technical tendency of nowadays.

There can be seen a remarkable advancement in technologies pertaining to a variety of electronic appliances related to up-to-date computers. In particular, a technical enhancement combined with the software is most sophisticated, and therefore the [softhouse-based] *software-based* business is aggressively expanded.

The [softhouse-based] *software-based* business is developed with brains, and its technical growth is increasingly accelerated. On the other hand, it is required that a good deal of assets be invested in the development of technologies of hardware, i.e., multiple computer-based electronic appliances. Life cycles of the hardware are relatively long as compared with the software, and it is not easy to improve the hardware because of requiring highly sophisticated techniques of specialty. In the actual systems, there still exist hardware here and there which can not come up with the technical advancement on the part of software. This is the real situation. This imbalance may be a big obstacle against the development of the general system. What is needed especially in the sector of software technologies is to facilitate an expansion of the general system by freely systematizing the FDDs, HDDs, ODDs and tape streamers which have been standardized and spread over as external storage devices of many kinds of electronic appliances.

Accordingly, it is the first object of the present invention, which has been devised under such circumstances, to miniaturize the recording/reproducing device to the greatest possible degree, and particularly, to reduce a thickness thereof.

Another object of the invention is to shrink a space for accommodating a variety of electronic appliances such as computers by virtue of the reductions both in configuration and in thickness of the recording/reproducing device and also to facilitate both functional improvements thereof and an expansion of the system.

DISCLOSURE OF THE INVENTION

According to the present invention, there is provided a recording/reproducing device comprising: at least a disk driving motor described above; a carriage including upper and lower heads; a carriage driving motor; a circuit board having a circuit for controlling operations of a read/write and of the motors; and a device body frame. The recording/reproducing device is made as small, i.e., thin as possible. To be more specific, a thickness of the device as a whole is set smaller than 20.5 mm.

A means for making the device thin is attained by taking the following components and arrangement.

For example, a rotor magnet of the disk driving motor involves the use of a rare earth group magnet. Where the rare earth magnet is employed, the same or higher performance than in the prior art can be secured even if the magnet is smaller than the conventional one. Hence, an outside diameter or an axis-directional length of the disk driving motor can be reduced. The rare earth group magnet is effective especially in reducing the thickness of the whole device when employing a spindle motor coaxial with the disk as a disk driving motor.

If the placement is made without causing planar overlapping of the carriage having the upper and lower heads with the disk driving motor, the device can be decreased in thickness on the whole. In the case of disposing a circuit board and a guide shaft with a deviation on the plane, the device thickness can likewise be reduced. Where neodymium ferrous boron is used as a rotor magnet for the carriage driving motor, sufficient torque can be obtained even in the case of miniaturization, and the whole device can be decreased in thickness.

Besides, it is possible to make the device still thinner by adequate and selective combinations of the above-described arrangements. The reduction in the device thickness contributes to a shrinkage of the space for incorporating the recording/reproducing device of the invention into an electronic appliance like, e.g., a computer. Especially when setting the device thickness to 20.5 mm or under, it is practical to mount two or more devices in a disposing space for a single unit of prior art device on the occasion of installing the recording/reproducing device of the invention instead of the existing recording/reproducing device the thickness of which is typically set to 41 mm as in a conventional 5-inch floppy disk drive.

BRIEF DESCRIPTION OF THE DRAWINGS

Other objects and advantages of the present invention will become apparent during the following discussion taken in conjunction with the reference drawings, in which:

FIG. 4 is a perspective view illustrating the jacket;

FIGS. 5 and 6 are partial schematic side elevations each showing an operation of a holder for holding the jacket;

Figure 37:
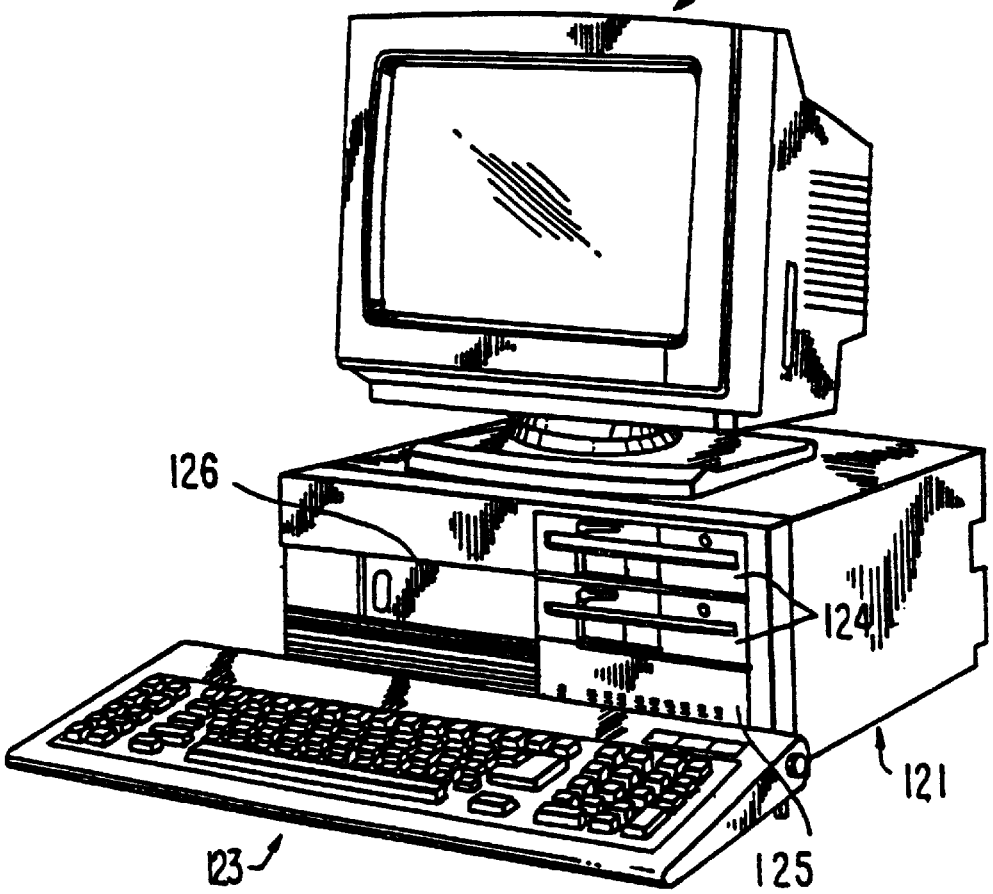

FIG. [38] *36* is a front elevation thereof;

FIG. 37 is a perspective view, illustrating the electronic appliance equipped with the recording/reproducing device, of assistance in explaining the present invention;

FIG. 38 is a sectional view depicting a carriage unit in a conventional recording/reproducing device;

FIG. 39 is an enlarged view showing the principal portion thereof;

FIG. 40 is a plan view depicting a chucking mechanism of the prior art recording/reproducing device;

FIG. 41 is a bottom view thereof;

FIG. 42 is a vertical sectional view illustrating a disk driving motor equipped with a conventional chucking mechanism;

FIG. 43 is a enlarged view illustrating a driving pin unit thereof;

FIG. 44 is a vertical sectional view depicting a configuration in which a disk driving motor in another prior art example is disposed;

FIG. 45 is a plan view depicting a prior art recording/reproducing device;

FIGS. 46 and 47 are partial side elevations in vertical section, each showing an operation of an eject mechanism of the prior art recording/reproducing device;

FIG. 48 is an exploded perspective view showing a configuration in which the recording/reproducing device is incorporated into a conventional electronic appliance; and FIG. 49 is a front elevation thereof.

BEST MODE FOR CARRYING OUT THE INVENTION

A recording/reproducing device according to the present invention will hereinafter be described specifically with reference to the accompanying drawings.

Figure 1:
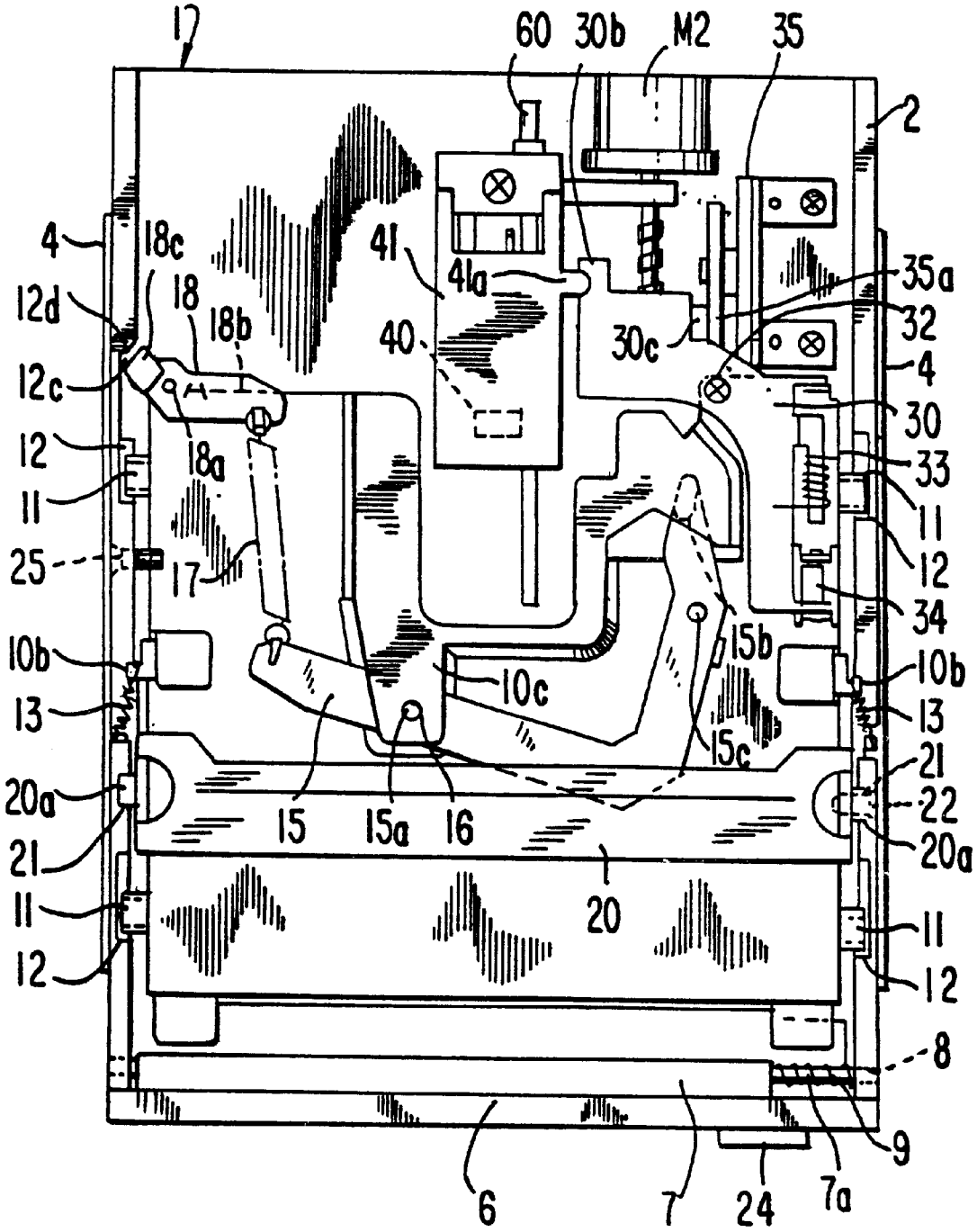
FIG. 1 is a plan view illustrating a recording/reproducing device according to the present invention.
Figure 2:
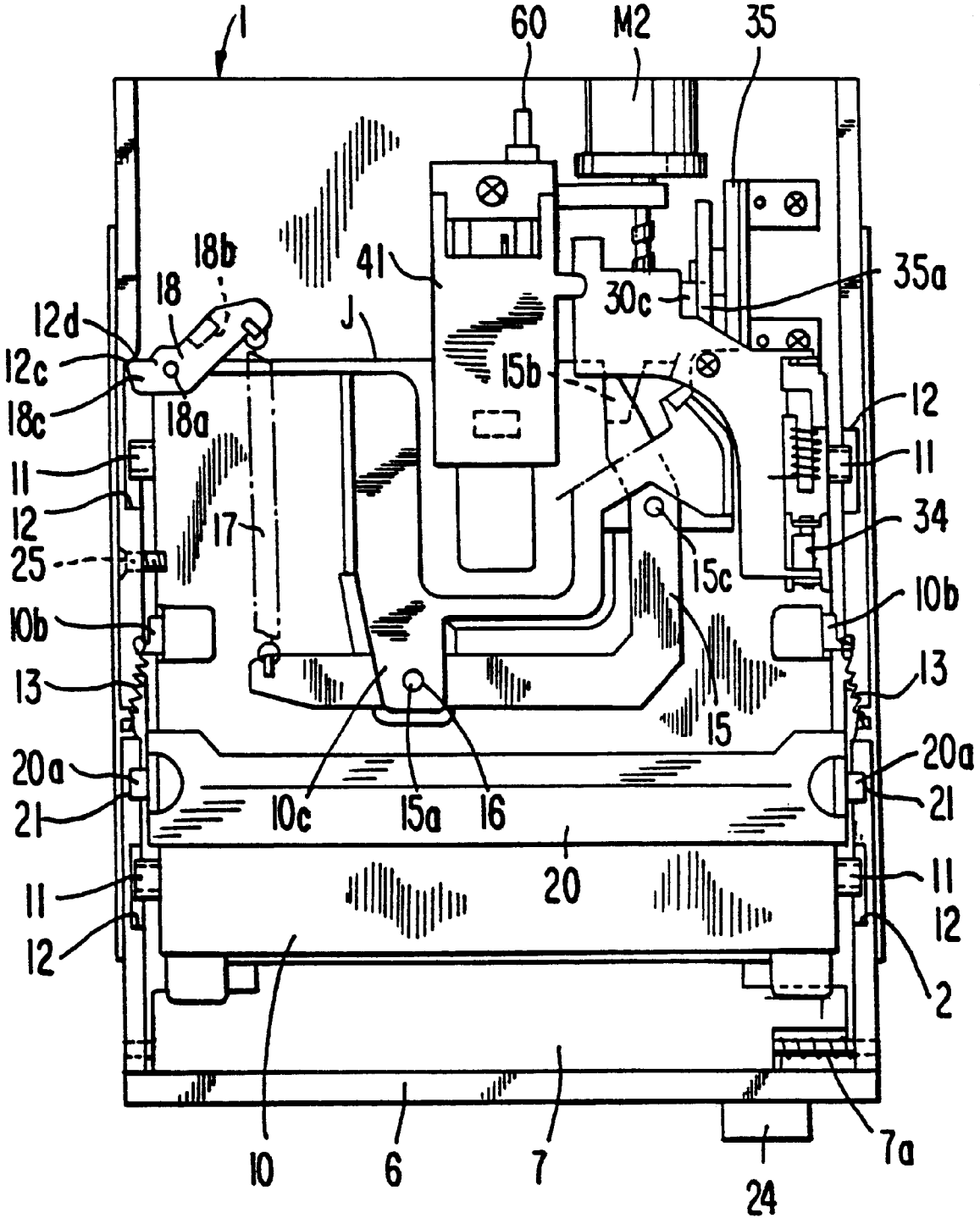
FIG. 2 is a plan view illustrating a state where the recording/reproducing device incorporates a jacket which accommodates a disk serving as a recording medium.
Figure 3:
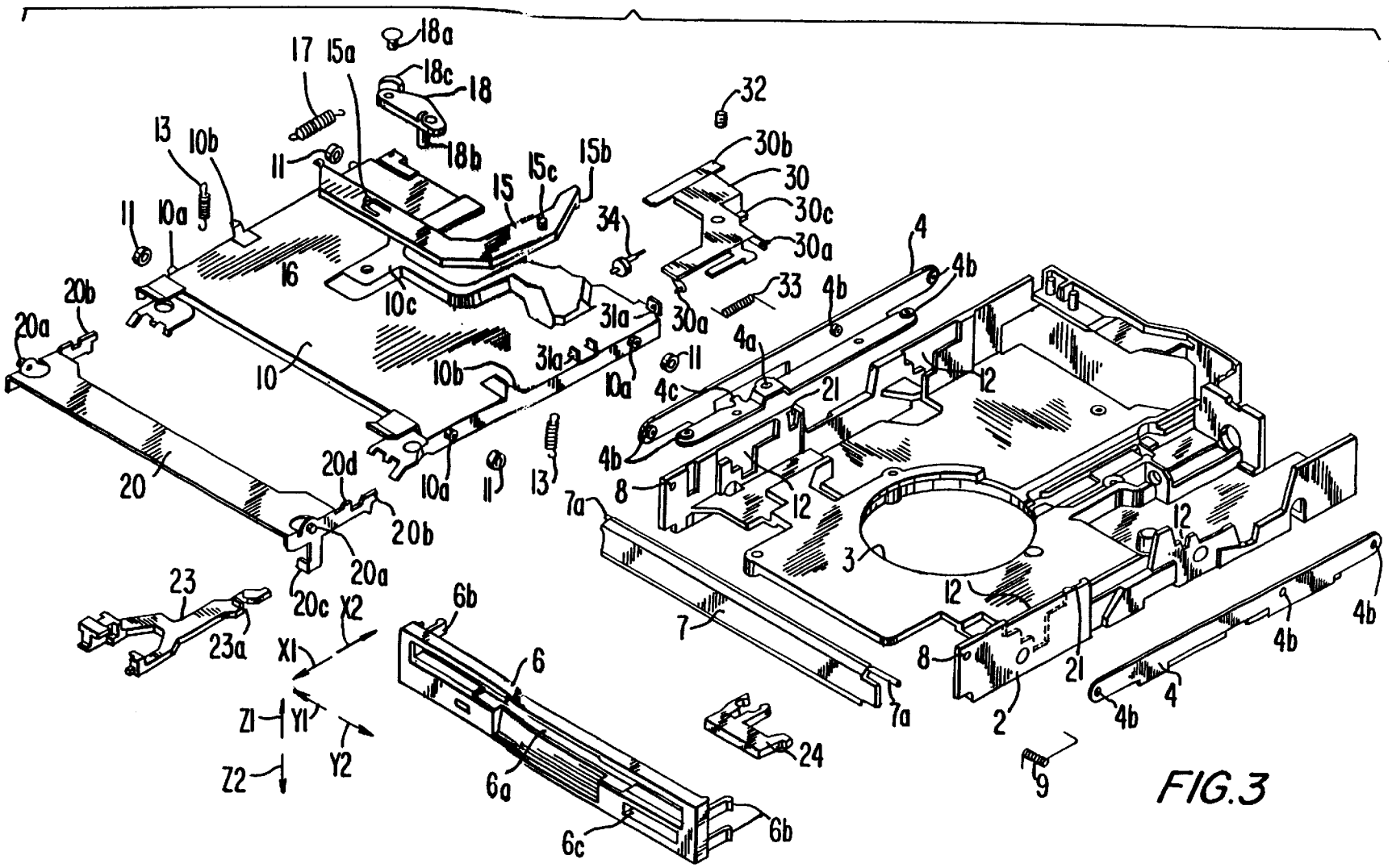
FIG. 3 is a partially cutaway exploded view in perspective, showing the recording/reproducing device of the invention.

Turning first to FIGS. 1 through 3, the numeral 1 represents a recoding/reproducing device. Designated at 2 is a device body frame formed to assume a box-like shape in which its upper and front surfaces are opened, and a central part of the bottom is formed with a circular opening 3 for installing a disk driving motor M1 which will be mentioned later. For convenience, the explanation will be given in such a manner that front and rear direction of the device are indicated by arrows X1 and X2 in FIG. 3, right and left directions are indicated by arrows Y1 and Y2, and up-and-down directions are shown by arrows Z1 and Z2.

The frame 2 is adaptive to an installation in an unillustrated electronic appliance such as a computer through a pair of brackets 4 located right and left. The brackets 4 are fitted to the frame 1 by inserting unillustrated screws into fitting holes 4a depicted in FIG. 3. Internal thread holes generally indicated at 4b *are provided* for fastening the electronic appliance with screws.

Attached to sides of the frame 2 on its front part, as depicted in FIG. 3, is a dressing plate 6 formed with an insertion port 6a for a jacket J (illustrated in FIG. 4) for accommodating a disk D defined as a recording medium by use of a stopper hook 6b provided integrally therewith. An inner surface of the dressing plate 6 is provided with a opening/closing shutter 7 for blockading the cartridge insertion hole 6a. The shutter 7 is rotatably fitted thereto by inserting a support shaft 7a into a hole bored in the frame 2. The shutter 7 is constantly rotationally biased in such a direction as to close the insertion port 6a with the aid of a torsion coil spring 9 secured to the support shaft 7a.

As illustrated in FIG. 2, a holder 10 for accommodating and holding the jacket J is provided in an interior of the frame 2. The holder 10, as depicted in FIG. 3, assumes such a configuration that bilateral parts of a tabular member made of a metal are bent inwards in a substantially C-like shape. A substantially central front surface, exclusive of the bilateral parts, of the underside of the holder 10 is opened. When setting the jacket J in the holder 10, the bilateral sides of the jacket J are inserted along inner surfaces of the C-like crooked parts. A dimension of the inner surface of the holder 10 is set substantially equal to a dimension of an external width of the jacket J.

Figure 7:
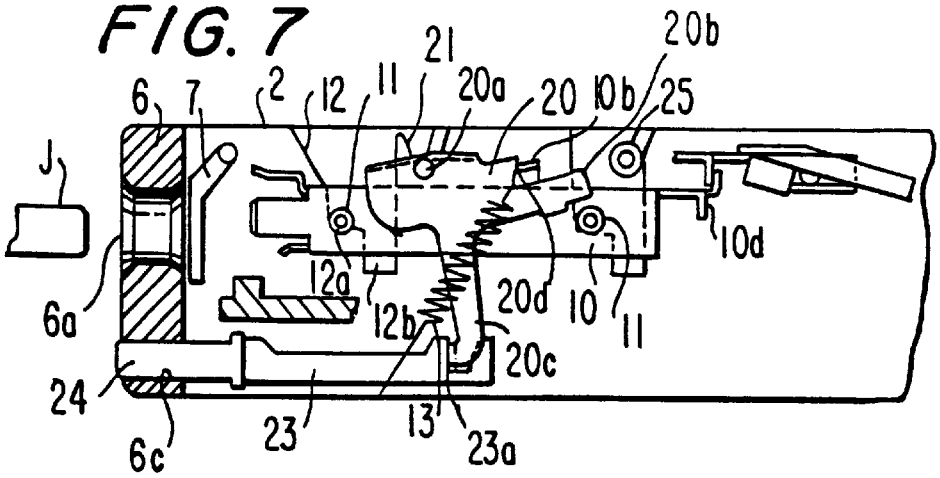
FIGS. 7 through 9 are partial side views in vertical section, each showing an operation of an eject mechanism.

Formed integral on the bilateral surfaces of the holder 10, as illustrated in FIG. 3, are a pair of short cylindrical protrusions 10a to which rollers 11 are so attached as to be rollable. Chased, on the other hand, in bilateral surfaces of the frame 2 are stepped guide grooves 12 for setting the holder 10 selectively in a jacket inserting/removing position and in a recording/reproducing position and holding it therein with the help of four [pices] *pieces* of rollers mentioned above so as to correspond to these rollers 11. Stretched between spring receivers 10b provided on the bilateral surfaces of the holder 10 and spring receivers 4c formed on the brackets 4, as depicted in FIGS. 3 and 7, are tensile coil springs 13 for constantly biasing the holder 10 downwardly in a forward oblique direction of the Figures. With this arrangement, the rollers 1 of the holder 10 are, as shown in FIGS. 5 and 6, selectively fixedly positioned at angular parts of upper stepped portions 12a or lower stepped portions 12b of the stepped guide grooves 12.

If the jacket J is not inserted into the holder 10, the holder 10 is in the jacket inserting/removing position —i.e, the rollers 11 are, as depicted in FIG. 5, positioned at the angular parts of the upper stepped portions 12a. The holder 10 is on the same level with the jacket insertion port 6a of the dressing plate 6, whereby the jacket J is insertable into the holder 10 via the insertion port 6a.

In this state, the jacket J is set into holder 10 in an arrowed direction of FIG. 5 and is intruded inwardly of the frame. At this time, the holder 10 moves right together with the jacket J in FIG. 5, and subsequently the rollers 11 roll, as illustrated in FIG. 6, from the upper stepped portions 12a to the lower stepped portions 12b, with the result that the holder 10 comes to a predetermined recording/reproducing position, videlicet, the jacket [j] *J* set in the holder 10 is positioned on a disk driving motor M1 which will be described later.

Note that the respective rollers 11 are so fitted to the protrusions 10a of the holder 10 as to be removable. The rollers having different diameters are selectively fitted thereto, thereby adjusting the level and position of the holder with respect to the frame 2.

Mounted, as illustrated in FIGS. 1 and 2, on an upper surface of the holder 10 is a shutter releasing lever 15 for shifting a shutter J1 of the jacket J to a release position by moving the shutter J1 in an arrowed direction of FIG. 4 when inserting the jacket J. The shutter releasing lever 15 is rotatable by engaging an integrally formed fulcrum pin 15a with a hole 18 shaped in a turnup piece 10c of the holder 10. Provided integrally at one end of the shutter releasing lever 15 is an operating protrusion 15b, set downwards, for opening the shutter J1 by engagement therewith. The operating protrusion 15b, when inserting the jacket J into the holder 10, acts to impinge upon an edge of the shutter J1, and the releasing lever 15 rotates anticlockwise in FIG. 1, thereby opening the shutter J1. Connected to the other end of the shutter releasing lever 15 is a return spring 17 of the lever 15, the other end of which is in turn connected to a trigger 18 so secured to the holder 10 as to be rotatable about a shaft 18a with the intention of constantly rotationally biasing the trigger 18 clockwise in FIG. 1.

Fitted integrally to one end of the trigger 18 is a downward protrudent piece 18b which, when mounting the jacket, impinges on an insertion-directional top end of the jacket J. As a result, the trigger 18 rotates anticlockwise in FIG. 1 resisting the return spring 17. When ejecting the jacket, the protrudent piece 18b and the shutter releasing lever 15 are rotated clockwise in FIG. 1 by a restoring force of the return spring 17, thus moving the jacket in an ejecting direction.

A free end part 18c of the other end of the trigger 18 is arranged to impinge, when inserting the jacket as shown in FIG. 2, on an inner surface 12c on the rear side of the groove formed in the frame side surface and, when ejecting the jacket, on an oblique surface 12d of a groove rear surface as shown in FIG. 1, thus preventing an unexpected movement of the holder 10 due to vibrations.

Mounted on the upper surface of the holder 10 is a lifter 20 for raising the holder 10 from the recording/reproducing position of FIG. 6 up to the jacket inserting/removing position of FIG. 5.

The lifter 20 is, as depicted in FIG. 3, formed [so] *to* assume such *a* configuration that both ends of an elongate tabular member made of a metal or the like are bent downward. Short cylindrical protrusions 209a integrally shaped on both ends thereof are, as depicted in FIGS. 1 and 2, fitted in recessed grooves 21 formed in the frame side surfaces, thus providing a rotatable holding state. Referring to FIG. 1, the numeral 22 denotes an anti-removing screw penetrating one short cylindrical protrusion 20a and screwed into the frame side surface, whereby the holder 10 is not removed upwards (on this side of the sheet in FIG. 1) when the device undergoes impulses from the outside. Note that the anti-removing screw may be omitted if a cover or the like is mounted on the upper surface of the device body.

Figure 8:
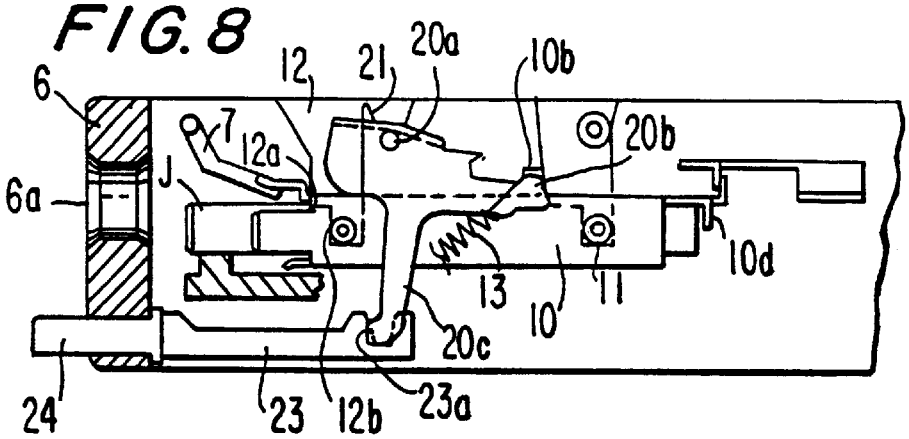
Figure 9:
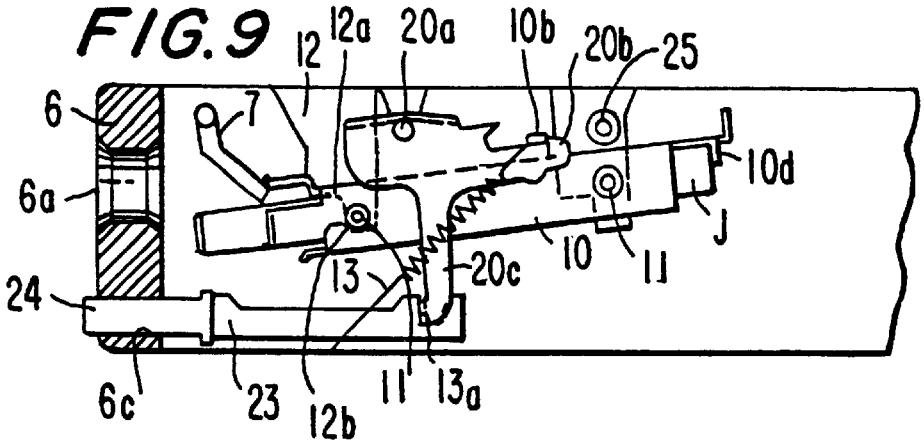

As depicted in FIG. 3, rotary arms [320b] *20b* for moving up the holder 10 through the spring receivers 10b provided on the holder 10 are shaped on both sides of the lifter 20. An operating arm 20c for rotating the lifter 20 about the protrusion 20a is integrally provided downwardly of one of the rotary arms 20b. The lifter 20 is, as illustrated in FIGS. 7 to 9, arranged to rotationally operate with the aid of an eject arm engaging with the operating arm 20c via a recess 23a and of an eject button 24 fitted thereto. The eject button 24 is slidably inserted into a hole 6c formed in the dressing plate 6. It is to be noted that the eject button 24 is detachably attached to the eject arm 23 to facilitate the replacement thereof in the illustrative example but may be formed integrally with the eject arm 23.

The lifter 20 is, when the holder 10 is in the jacket inserting/removing position shown in FIG. 5, brought into a state depicted in FIG. 7, while the eject button 24 is slightly retracted inside a hole 6c of the dressing plate 6. In the state of FIG. 7, a protrusion 20d shaped on the lifter 20 loosely abuts against the spring receiver 10b of the holder 10, and hence the clockwise rotations of the lifter 20 in FIG. 7 are hindered.

In the state [OF] *of* FIG. 7, when inserting the jacket J from the jacket insertion port 6a of the dressing plate 6 into the interior of the holder 10, the top of the jacket J impinges upon a stopper 10d provided at the rear end of the holder 10. In the case of effecting further intrusion, the jacket J is inserted together with the holder 10 into the device body frame 2, thus setting it in the recording/reproducing position depicted in FIG. 8. At this time, the lifter 20 rotates clockwise in FIG. 7 through the spring receiver 10b. Concomitantly with the rotation of the lifter 20, the eject button 24 is, as illustrated in FIG. 8, protruded forwardly of the dressing plate 6 through the operating arm 20c and the eject arm 23.

A recording/reproducing operation is performed in such a state. When depressing the eject button 24 on finishing that operation, the lifter 20 rotates anticlockwise in FIG. 8 with the help of the eject arm 23 and the operating arm 20c. The holder 10 is raised by the rotary arm 20b of the lifter 20 through the spring receiver 10b and then reverts to the jacket inserting/removing position of FIG. 7. In the illustrative example, at that time the spring receiver 10b formed in the holder 10 is set slightly forward so that, as shown in FIG. 9, the rear part of the holder 10 is raised ahead and collides with the stopper 25 provided on the frame side surface. Thereafter, the holder reverts to the state depicted in FIG. 7 by depressing the eject button 24. However, another practical arrangement is that the priority of lifting is given to the front part of the holder 10, or alternatively the front and rear parts thereof can be raised in parallel by changing a position of the spring receiver 10b.

Figure 10:
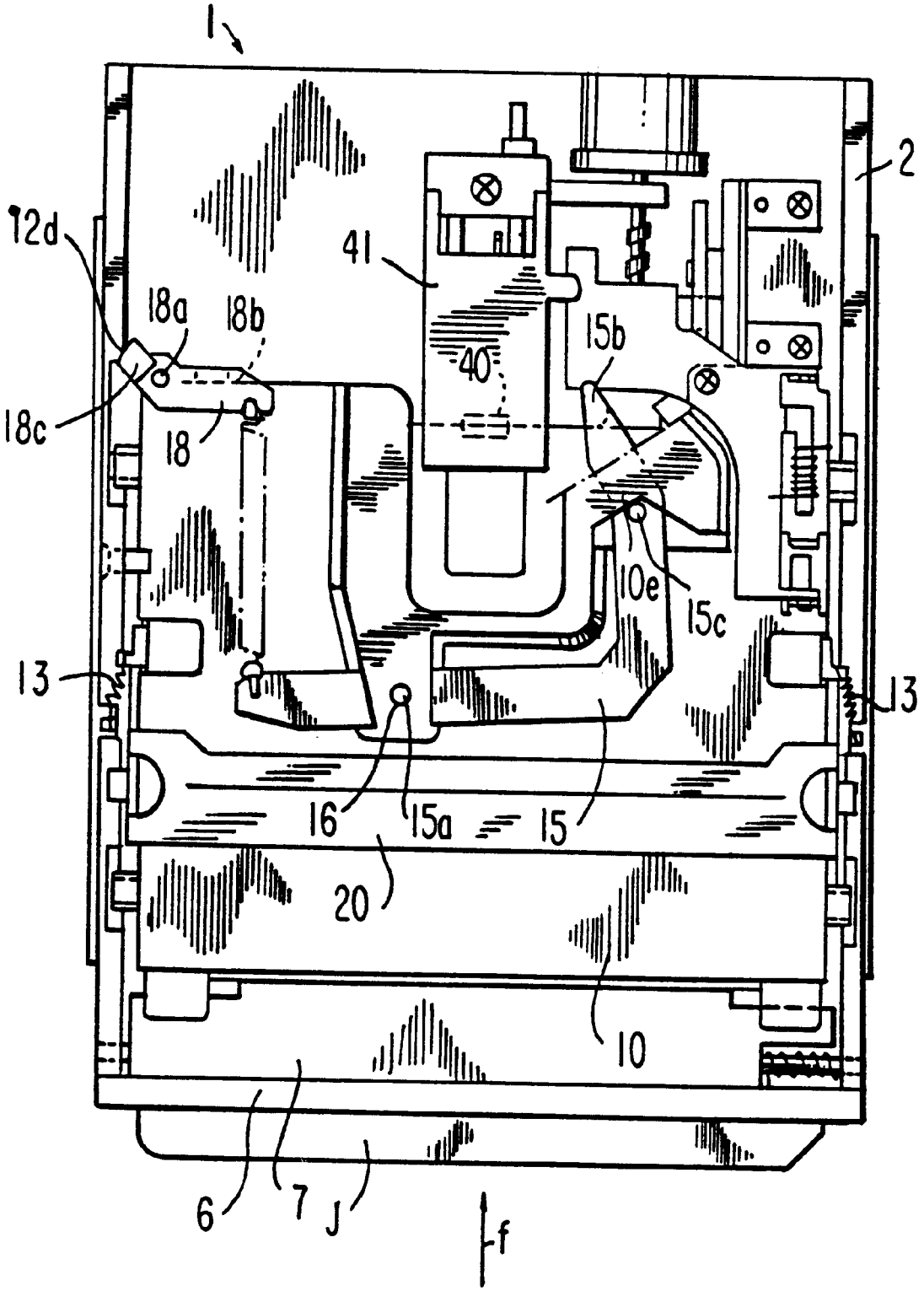
FIG. 10 is a plan view depicting a state where the jacket is mistakenly loaded.

The description will next be focused on a lock process if the holder 10 makes unexpected actions. The unexpected actions imply that the jacket J is mistakenly inserted, or the holder 10 slides before the shutter J1 of the jacket J opens, or the shutter J1 does not open. Turning to FIG. 10, if the jacket is inserted in an arrowed direction f in such [a-state] *a state* that its upper and lower surfaces or front and rear parts are reversed, the insertion-directional top end of the jacket J collides with the operating protrusion 15b of the shutter releasing lever 15, whereby the lever 15 slightly rotates anticlockwise in FIG. 10. When further inserting the jacket, a lock pin 15c provided on the shutter releasing lever 15 impinges on a turnup piece 10e defined as a part of the holder 10 before abutting against the downward [protrudent] *protruding* piece 18b of the trigger 18. Subsequently, the holder 10 slightly slides in the arrowed direction f resisting the biasing force of the spring 18, and eventually the free end part 18c of the trigger 18 mounted on the holder 10 impinges upon the oblique surface 12d formed on the frame 2, thereby hindering the holder 10 from sliding in the arrowed direction [a] *f*. Thus, there is developed a state where the jacket can not be inserted any more. With this arrangement, the rollers 11 of the holder 10 do not come off the upper stepped portions 12a depicted in FIG. 5, and it follows that the installation in the recording/reproducing position shown in FIG. 6 is not attained. Even if the holder 10 slides in the arrowed direction f by dint of any outside force without causing oscillations of the shutter releasing lever 15, the holder 10 is not set by the above-mentioned operations. It is therefore possible to prevent damages to the components incorporated into the device.

Figures 11, 12:
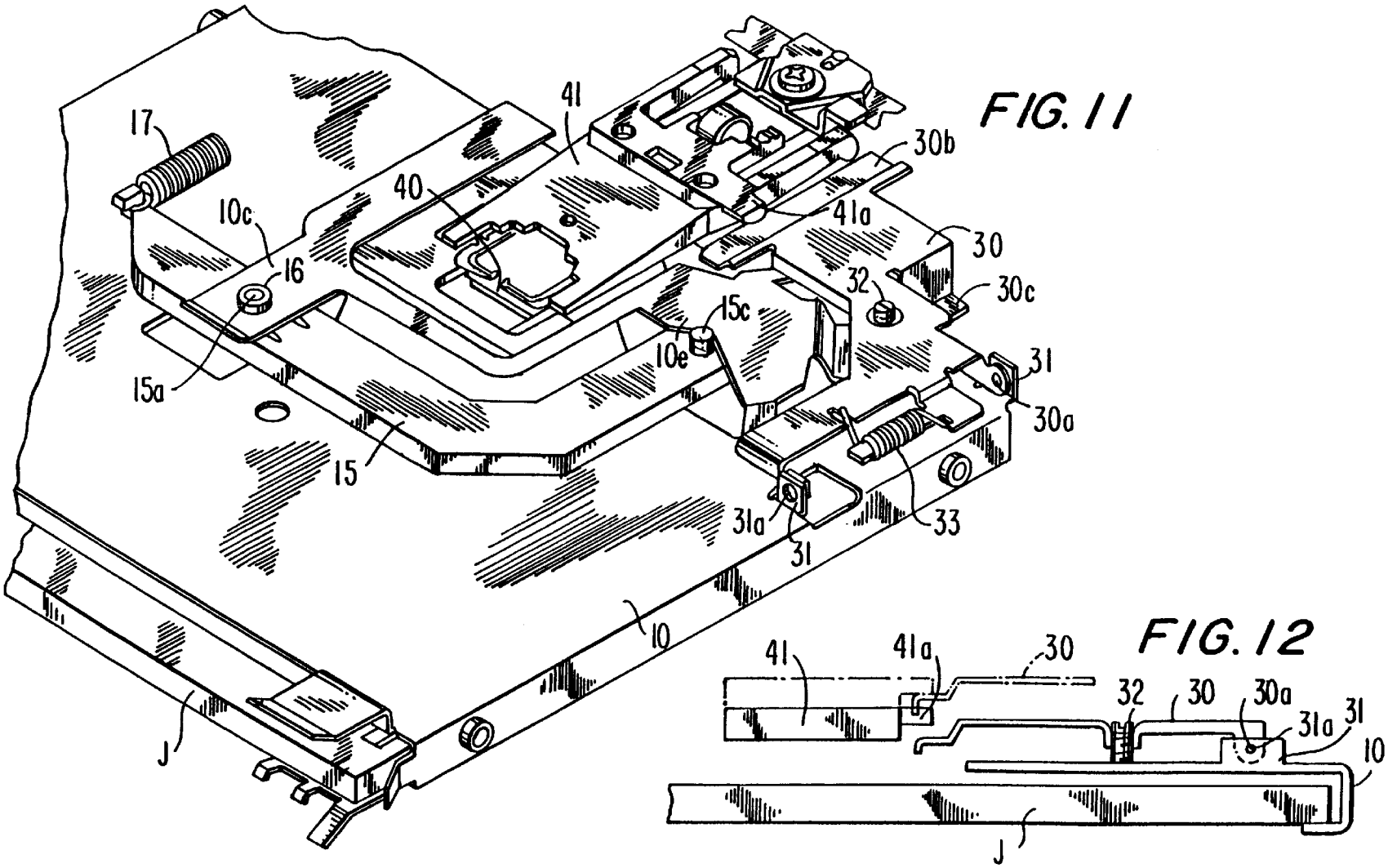
FIG. 11 is a perspective view illustrating a head loading unit.
FIG. 12 is a sectional view depicting the head loading unit.

A head load mechanism will next be described. An upper head 40 and an upper carriage 41 for holding the head 40 are, as shown in FIGS. 1 and 11, located in rear of the holder 10. Mounted on a rear upper surface of the holder 10 is a head load arm 30 for, as illustrated in FIGS. 1, 3, 11 and 12, retreating upwards the upper head 40, interlocking with the lifting operation of the holder 10. Note that a lower head 50 and a lower carriage 51 which will hereinafter be explained are provided under the upper head 40 and the upper carriage.

The head load arm 30 is, as shown in FIGS. 3 and 12, so mounted as to be vertically rotatable by engaging a pair of protrusions 30a integral with the arm 30 with engaging holes 31a formed in a pair of erect pieces 31 on the holder upper surface. The head load arm 30 is kept on a predetermined level by impinging, on the holder upper surface, a lower end of an adjusting screw 32 screwed into a nearly central part of the head load arm 30. Designated at 33 is a torsion coil spring for constantly rotationally biasing the head load arm 30 in such a direction as to impinge upon the holder upper surface.

In a state where the jacket J inserted in the holder 10 is set in the recording/reproducing position, the holder 10 is situated in a position indicated by a solid line of FIG. 12. In this state, when ejecting the jacket J, as discussed above, the holder 10 ascends, and correspondingly the [hear] *head* load arm 30 also moves upwards in parallel in the manner indicated by a dotted line of FIG. 12. This action permits a free end part 30b of the head load arm 30 to engage with a raising member 41a of the upper carriage 41, thereby raising the upper head 40 together with the upper carriage 41. A predetermined clearance between the upper head 40 and the jacket J is thus secured. It is to be noted that, even if there is caused a scatter in height of the holder 10, it is feasible to properly adjust the clearance by moving the free end part 30b of the head load arm 30 up and down in the Figure. There may be, if necessary, provided an eccentric pin 34, depicted in FIGS. 1 and 3, for adjusting the free end part 30b of the head load arm 30 to have parallelism.

As depicted in FIG. 1, a damper 35 is disposed aside of the head load arm 30. The damper 35 is constructed such that a damper arm 35a thereof engages with a segment 30c of the head load arm 30. The damper 35 behaves to prevent an intensive impingement of the upper head 40 upon the disk D when setting the jacket in the recording/reproducing position.

Constructions of the upper and lower heads 40 and 50 and also the carriages 41 and 51 will be explained in conjunction with FIGS. 13 to 16 inclusive.

Figure 15:
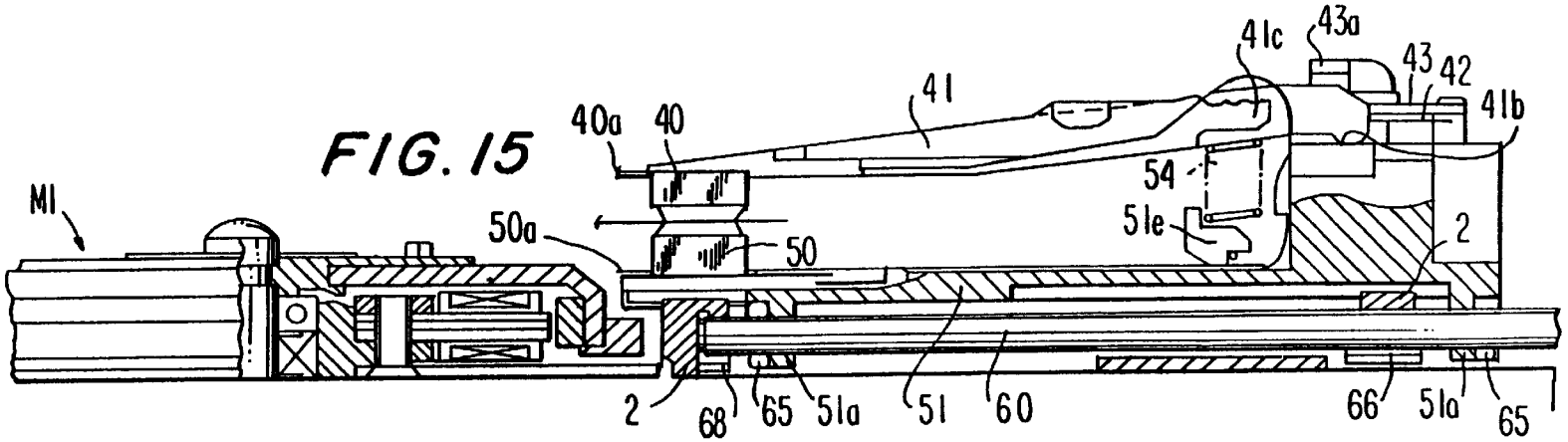
FIG. 15 is a vertical sectional side view illustrating a geometry in which the heads and the carriage are disposed.
Figure 16:
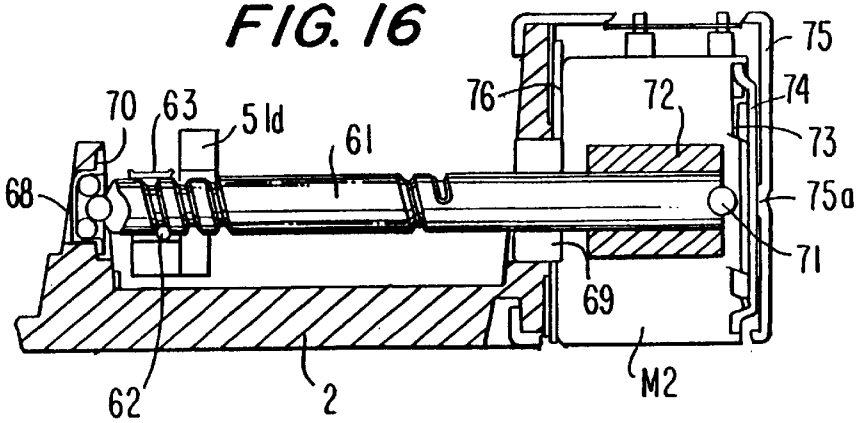
FIG. 16 is a vertical sectional side view illustrating a geometry in which a carriage driving motor is disposed.

The upper carriage 41 for holding the upper head 40 is, as illustrated in FIGS. 4 and 15, located on the lower carriage 51 for holding the lower head 50. The lower carriage 51 is moved along a carriage guide shaft 60 by means of a stepping motor M2 serving as a carriage driving motor, thereby setting the upper and lower heads 40 and 50 in such positions as to move in the radial direction with respect to the disk set in the recording/reproducing position.

A bearing member 51a for the guide shaft 60 [is], as illustrated in FIG. 15, is integrally provided on the underside of the lower carriage 51. A [sintering] *sintered* metal [85] *65* for movably guiding the lower carriage 51 is press-fitted in the bearing member 51a. Fixed to a recess 51b, shown in FIG. 14, of the lower carriage 51 by bonding is a lead pin 62 for engagement-tracing the groove of a lead screw 61 attached to the stepping motor M2. A lead pin pressurizing spring 63 is fitted in an internal thread hole 51c of the lower carriage 51 with a screw 64 so that the lead pin 62 exactly traces the groove of the lead screw 61 by pressurizing the lead pin 62. Provided on the lower carriage 51 is a stopper 51d for preventing the lead pin 62 from coming off the groove of the lead screw 61 when an impulsive force is exerted thereon. Bonded fixedly to the top end of the lower carriage 51 are a shield plate 52 for shielding a magnetic leakage from the disk driving motor M1 which will be mentioned later and a lower head 50 for recording and reproducing signals on and from the disk in such a manner that the shield plate 52 and the lower head are attached to a gimbal composed of a leaf spring to have a gimbal structure for keeping the head and the disk in a well-contacted state. Movably attached to a part of the lower carriage 51 is a 00 shutter 53 for blockading a photo sensor (not illustrated) for detecting the fact that the lower carriage 51 moves to a reference position, the shutter 53 being movable in an arrowed direction g in FIG. 14.

An upper head 40 fitted to an upper gimbal 40a is, as in the case of the lower head 50, bonded to the upper carriage 41. The upper carriage 41 includes a pair of fulcrum members 41b serving as a rotary fulcrum in order to raise the raising member 41a by use of the head load arm 30 when setting or ejecting the jacket J. The upper carriage 41 is attached to the lower carriage 51 through a suspension 42 formed of a lead spring. The numeral 43 represents a suspension holder; and 44 a fitting screw screwed into an internal thread hole 51f of the lower carriage 51.

Stretched between a spring catching member 51e of the lower carriage 51 and another spring catching member 41c of the upper carriage 41 is a head load spring 54 for pressurizing the lower and upper heads 50 and 40 to obtain a contact pressure with the disk. Three catching positions are provided particularly for the spring catching member 41c of the upper carriage 41, thus giving s structure capable of subtly adjusting the pressure acting on the head. A position of the head load spring is set in an interior of a triangle region defined by the raising member 41a of the upper head 40 and the pair of fulcrum members 41b, as a result of which the upper carriage can horizontally be raised with no inclination even when lifting only one portion of the raising member 41b. When exerting the impulses in a state where the upper carriage 41 is raised by the raising member 41a, the top end of the upper carriage 41 is lowered, and at the same moment the fulcrum members 41b float. In an extreme case, the lower head 50 collides with the upper head 40, and, it can be considered, these heads are thereby broken. For this reason, a holder member 43a for the fulcrum members 41b of the upper carriage 41 is shaped on the suspension holder 43 in order to prevent floating of the fulcrum members 41b, thereby improving anti-impulse properties. Led from the upper and lower heads 40 and 50 are flexible printed boards 40b and 50b for connecting the heads to a control circuit, the thicknesses of which are small. This causes a decline in handling property, and hence grooves 51g are chased in the lower carriage 51 for guiding them.

Explaining the flexible printed board 50b catered for the lower head, a crank member 51h [of] *is* provided on the lower carriage 51 to hold the flexible printed board [50h] *50b*.

The flexible printed board 40b for the upper head is arranged such that the board 40b is guided by the catching member 41d of the upper carriage 41, thus keeping the flexible printed board 40b in a predetermined configuration.

The carriage guide shaft 60 is secured to the frame 2 from the underside (from the same direction as the fitting surface of the disk driving motor which will be described later) by use of a clamp 66 with a screw 67.

The stepping motor M2 for effecting a movement-positioning process of the carriage in the radial direction of the disk along the guide shaft 60 rotates through an angle of 18 degrees by one step. The lead screw 61 is guided by a pivot bearing 68 whose top end is fitted to the frame 2 and by a metal bearing 69 whose central part is likewise fitted to the frame 2, the lead screw 61 undergoing forces acting both in a thrust direction and in a radial direction. Balls 70 and 71 each having a high hardness are embedded into front and rear ends of the lead screw 61, thus ameliorating an abrasion resistant property.

A rotor magnet 72 of the stepping motor M2 is fixedly bonded to the lead screw 61. The rotor magnet 72 involves the use of neodymium ferrous boron. Sufficient torque is obtained even when reducing the diameter thereof because of a large magnetic force. Thus, the stepping motor is miniaturized. A thrust spring 73 for imparting a thrust-directional pressure to the lead screw 61 is set at the rear end of the stepping motor 2, and a motor cap 74 undergoes a thrust force. Disposed outwardly of the stepping motor M2 is a motor clamp 75 whose spring property acts to fix the stepping motor to the frame 2.

Based on this construction, it is a common practice that the carriage position is adjusted while rotating the stepping motor M2. The lead screw 61 rotates with revolutions of the stepping motor M2. The lead pin 62 engaging with the lead screw groove moves to adjust a position of the carriage. A contact portion between the motor clamp 75 and the motor M2 is formed to be a projection 75a. This arrangement facilitates both revolutions of the stepping motor M2 and the adjustment. Besides, a flange 76 of the stepping motor M2 is toothed to facilitate adjustment by a jig and automatization as well.

Figure 13:
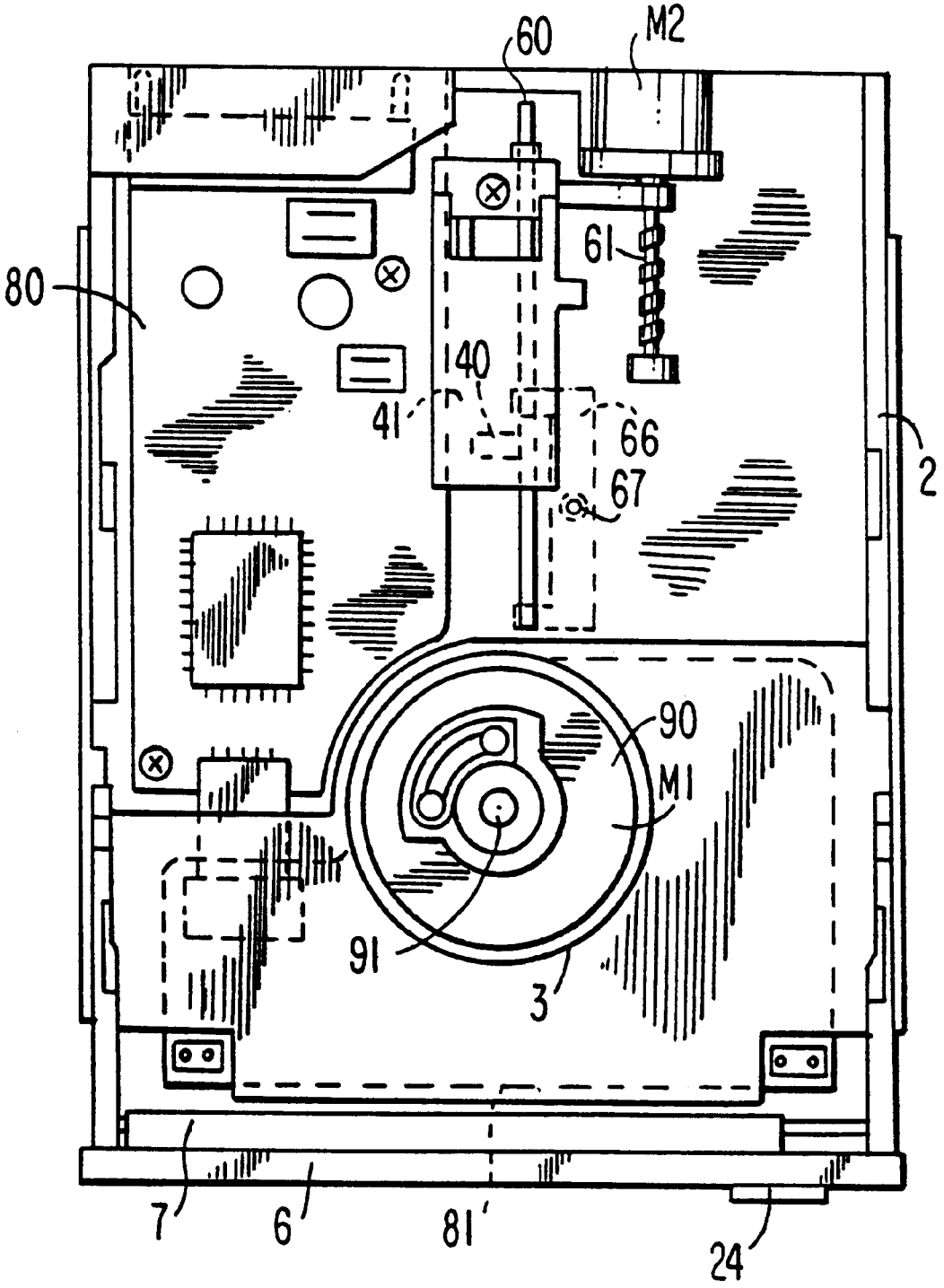
FIG. 13 is a plan view showing the recording/reproducing device when dismounting the holder.
Figure 14:
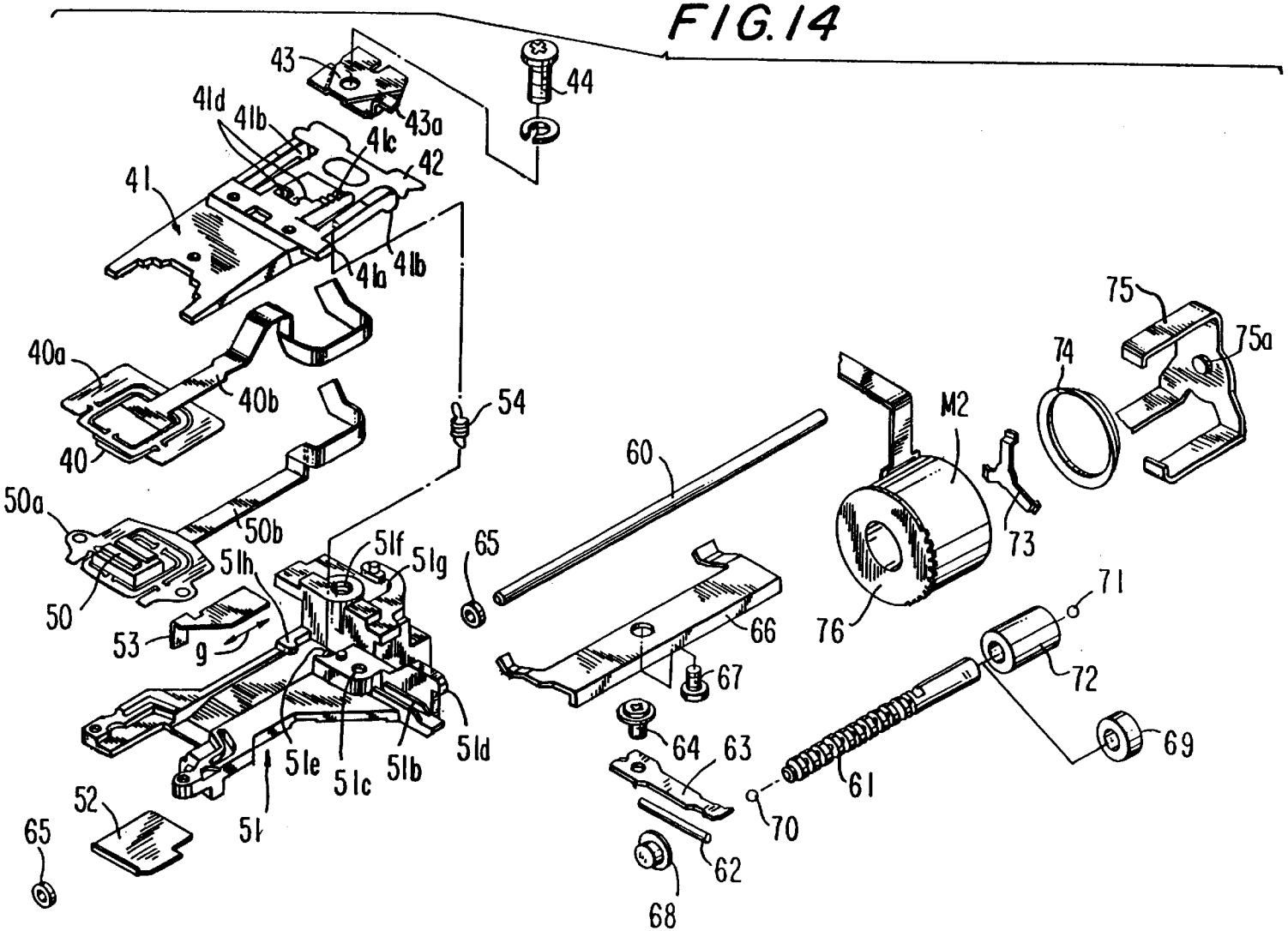
FIG. 14 is an exploded perspective view showing heads, a carriage and a driving mechanism thereof.
Figure 17:
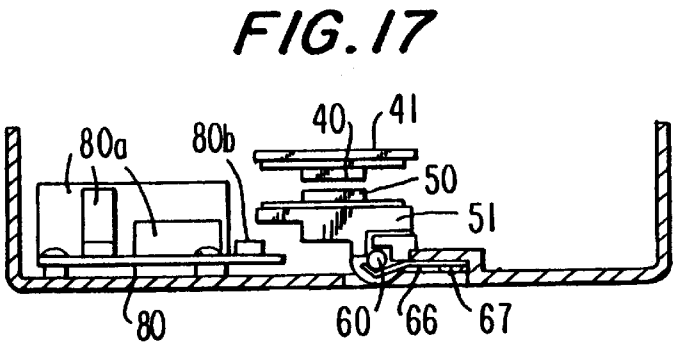
FIG. 17 is a front elevation in vertical section, showing a geometry in which a control board and the carriage are disposed.

Note that centering of the stepping motor is effected by engaging the metal bearing 69 fitted to the frame 2 with the flange 76 of the stepping motor Next, as illustrated in FIGS. 13 and 17, a control board 80 flush with the carriage 51 is fixed to the frame 2 with a screw. The control board 80 and the carriage guide shaft 60 are, as depicted in FIG. 13, disposed with some deviation on the plane, thus making the device thin so that the carriages 41 and 51 can be disposed as low as possible. The control board 80 is partly overlapped with the carriage 51. More specifically, as illustrated in FIG. 17, for the purpose of avoiding the entire superposition on the carriage 51, a part

80a having a large height on the control board 80 and a part 80b having a small height are overlapped with a part of the carriage 51. Fundamentally, overlapping of the control board 80 with the carriage 51 is prevented in the thicknesswise direction (up-and-down direction in FIG. 17).

A disk chucking mechanism for chucking the disk and a disk driving motor for rotationally driving the disk will next be explained with reference to FIGS. 13 and 18 through 21.

Figure 18:
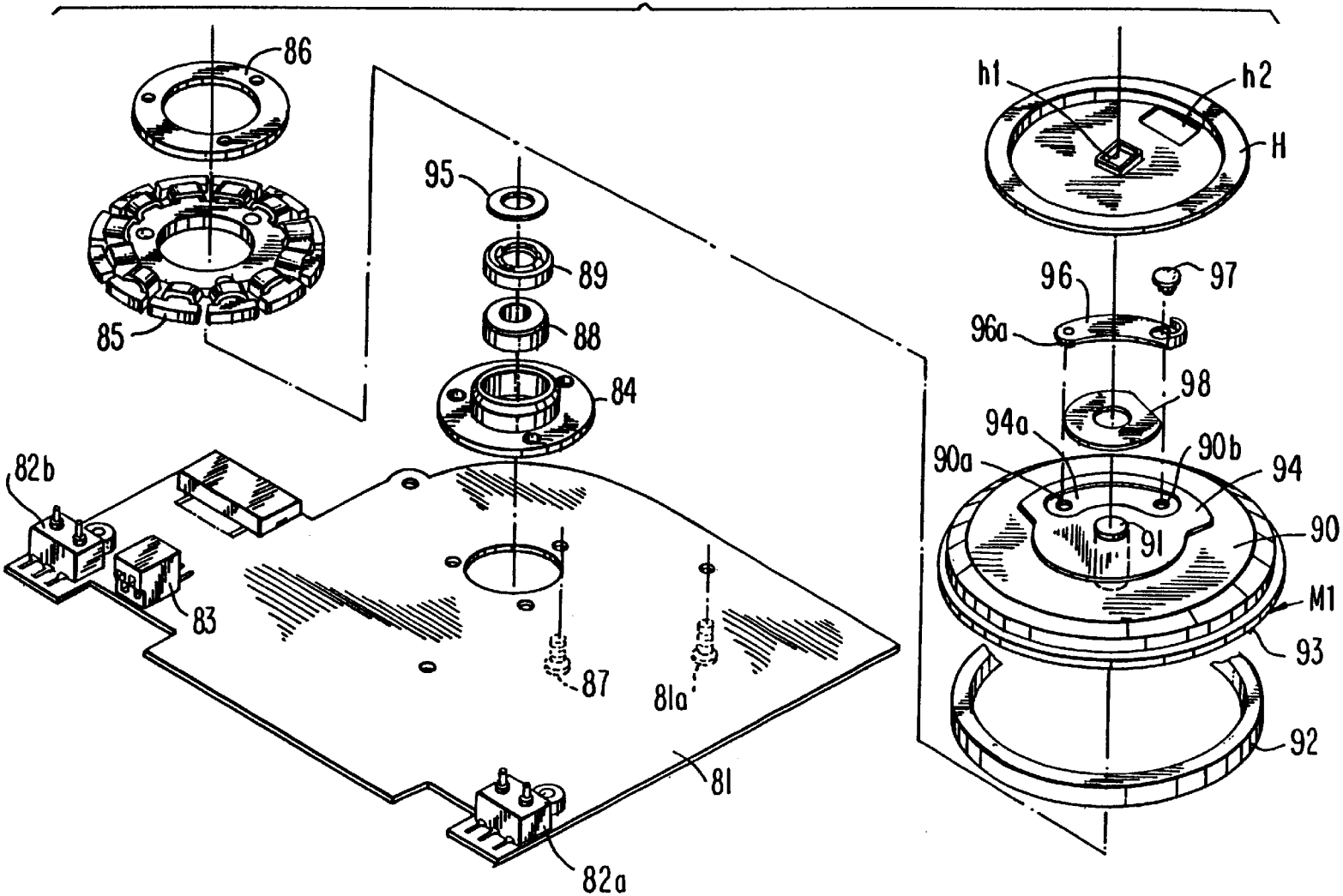
FIG. 18 is an exploded perspective view depicting a disk driving motor and a disk chucking mechanism.

A disk driving motor M1 in this embodiment involves the use of a spindle motor for performing a direct drive[,]. The motor M1 is supported on a motor board 81 into which the motor control board is packaged. The board 81 is mounted on the frame 2, whereby the motor M1 is, as shown in FIG. 13, located within the opening 3 of the frame 2. Mounted on the motor board 81 are detecting switches 82a and 82b for detecting that the jacket J has, as illustrated in FIG. 18, been set in the recording/reproducing position or detecting a condition of the jacket J and also a connector [88] *83* for mounting LEDs for displaying operations of the recording/reproducing device. A housing 84 and a stator 85 wound with a coil are disposed at the center of the motor board 81 and fixed with a nut plate and three pieces of countersunk screws while these components are sandwiched therebetween.

A ball bearing 89 is, after press-fitting the metal bearing 88, bonded to the housing 84. A rotor magnet (driving magnet) disposed vis-a-vis with the stator 85 is fixedly bonded to these bearings 88 and 89. A rotor 90 is constructed by simultaneously forming a detecting magnet 93 for detecting the number of revolutions of the motor M1, a chucking magnet 94 for attraction-positioning the hub H of the disk D and a rotary driving shaft 91 by use of plastic magnets. The rotary driving shaft 91 of the rotor 90 is inserted through a spacer 95 for adjusting an axial position. [The] *A* rotor magnet 92 is composed of a rare earth group high performance magnet, which leads to radial and axial miniaturization and a reduction in thickness of the rotor magnet 92 itself and further of the disk driving motor M1.

Fixedly formed on the upper surface of the rotor 90 is the chucking magnet 94 which is in turn formed with a circular-arc opening 94a through which the rotor surface is partly observed. Provided in this opening 94a are a fulcrum hole 90a constituting a rotary fulcrum of the chucking lever 96 by engaging with a burring-machined fulcrum shaft member 96a fitted to the chucking lever 96 for centering and rotationally driving the hub H while engaging with a driving hole h2 of the hub H and also a caulking hole 90b for fixedly caulking the level pin 97 for guiding the chucking lever 96 and for fitting it to the rotor 90. Besides, a slide sheet 98, made of a material exhibiting a good sliding property, for receiving the hub H is stuck to the upper surface of the chucking magnet 94. A screw generally indicated at 81a is intended to secure the motor board 81 to the frame 2. In the illustrative example, the motor board 81 is fixed from underside of the frame 2 with three pieces of countersunk screws 81a.

Figure 19:
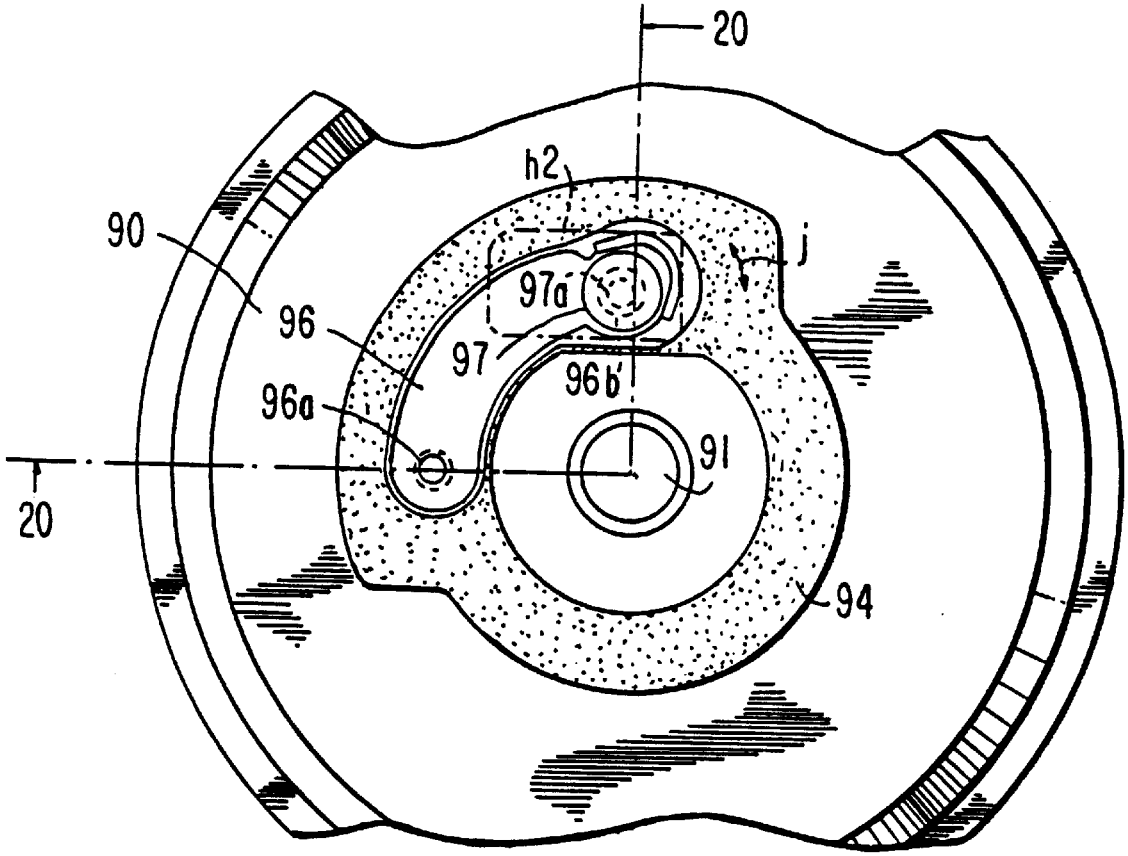
FIG. 19 is a plan view of the chucking mechanism.
Figure 20:
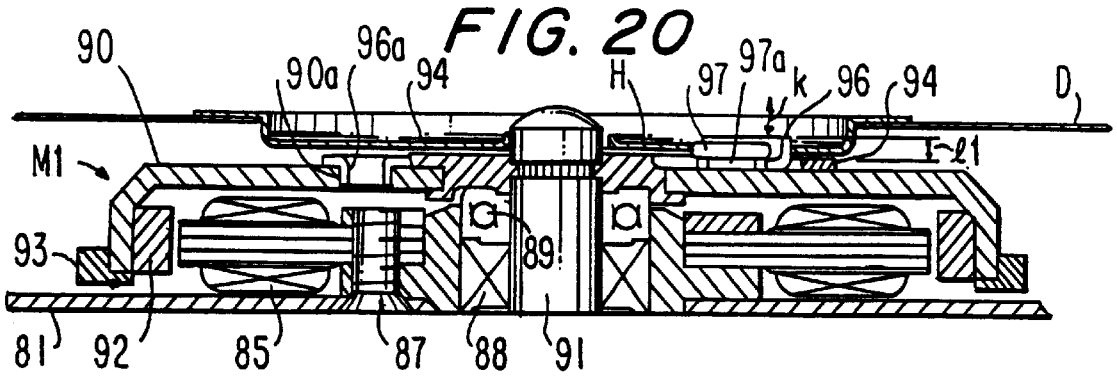
FIG. 20 is an enlarged sectional view taken substantially along the line [A—A] *20—20* of FIG. 19.

Referring to FIG. 19, a portion, marked with a multiplicity of points in the Figure, of the chucking magnet 94 is magnetized to assume such a configuration that adsorptive forces of the hub H become uniform with respect to the center of the rotary driving shaft 91. As illustrated in FIGS. 19 and 20, 21 and 22 a diameter of the guide hole 96b of the chucking lever 96 is slightly larger than a guide diameter 97a of the lever pin 97, whereby the chucking lever 96 is allowed-to make a necessary amount of movement in an arrowed direction j in FIG. 19. On the other hand, a permissible movement in an arrowed direction k of FIG. 20 is limited to a small clearance between the lever pin 97 and the chucking lever 96, thus providing a structure in which the burring-machined fulcrum shaft member 96a fitted to the chucking lever 96 does not disengage from the fulcrum hole 90a for constituting the rotary fulcrum of the chucking lever 96.

On the basis of this constitution, the hub H is, as depicted in FIG. 20, adsorbed onto the slide sheet 98 by dint of the chucking magnet 94; and the hub H is positioned both in the rotational direction and in the radial direction while being engaged by, as illustrated in FIG. 19, tuning a position of the driving hole h2 of the hub H to the chucking lever 96. In this case, the driving hole h1 of the hub H is not initially matched with the position of the chucking lever, and it follows that the hub H is a little bit slant. However, the chucking lever 96 is aligned with the driving hole h2 of the hub H by the revolutions of the motor M1, and then the hub H is set in the position depicted in FIG. 20. It has proven to be most preferable from an experiment to set an engagement quantity 11 of the chucking lever of FIG. 20 with the hub H to 0.78 mm or less in order to reduce the inclination of the hub H and effect the stable chucking process.

Figure 21:
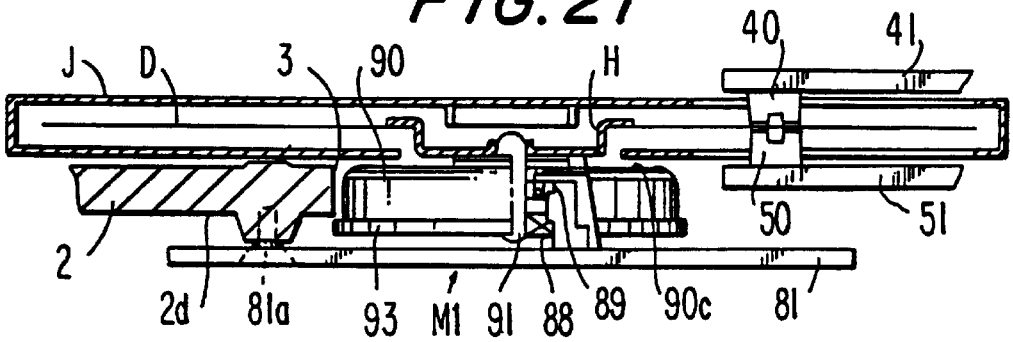
FIG. 21 is a sectional view showing a configuration in which a disk driving motor is disposed.

An upper surface 90c of the rotor 90 of the motor M1 is, as illustrated in FIG. 21, substantially flush with an upper surface 2d of the frame 2 but is set somewhat lower than this, thereby preventing interference with the jacket J which accommodates the disk D.

Furthermore, as shown in FIG. 21, the bearing unit of the motor M1 [ha] *has* such a construction that the rotary driving shaft 91 fixed to the rotor 90 is inserted into a central hole penetrating the metal bearing 88 and the ball bearing 89. Based on this construction, when, for instance, large impulses are applied from the outside, there exists a probability that the rotary driving shaft 91 moves upwards in the Figure, i.e., in a direction opposite to the motor board 81. For this reason, the speed detecting magnet 93 provided on the outer peripheral surface of the rotor is formed larger *than* the hole diameter of the opening 3 of the frame 2. Owing to this arrangement, when undergoing the impulses, and even *when* the rotor 90 moves upward in the Figure, the speed detecting magnet 93 impinges on the circumference of the opening 3, thereby preventing the [removable] *removal* of the rotary driving shaft 91 and the rotor 90.

At [lest] *least* the lower carriage *51* is disposed [ion] *in* the radial direction outwardly of an outer shape of the rotor 90 [Of] *of* the motor M1. Even when the carriage 51 moves to the innermost periphery of the disk D, the superposition of the rotor 90 on the carriage 51 in the thicknesswise direction (up-and-down direction in FIG. 21) is prevented. Particularly in the illustrative embodiment, the outer shape of the rotor 90 has a diameter of 38 mm, while the top end of the carriage 51 when moving farthest toward the rotor is positioned 19.5 mm away from the center of the motor M1, which eliminates the interference of the rotor 90 with the carriage 51.

Note that an outer shape of the speed detecting magnet 93 has a diameter of 42 mm. The magnet 93 is partly overlapped with the carriage 51 in the thicknesswise direction. However, the speed detecting magnet 93 is formed small in the thicknesswise direction. This arrangement, as in the case of partial overlapping of the control board 80 with the carriage 51 in FIG. 17, does not exert an influence in the thicknesswise direction of the recording/reproducing device. Consequently, a thickness ranging from the lower surface of the motor board 81 to the rotor upper surface can be reduced down to 6 mm in this embodiment.

A factor for determining the thickness of the actual recording/reproducing device as a whole will be given as follows. The hub H fitted with the disk is, as depicted in FIGS. 18 and 20, adsorbed onto the motor M1, and in order to obtain, as shown in FIG. 15, a well-contacted state there is disposed the upper head the recording/reproducing surface of which is substantially flush with the disk. The upper carriage 41 for supporting the upper head 40 is further provided. For taking the jacket accommodating the disk [is taken] out of the recording/reproducing [device,.the] *device, the* upper head 40 is raised a distance equivalent to [the] half of *the* thickness of the jacket J to steer clear of the jacket J.

A thickness of the motor M1 is, as explained earlier, set to 6 mm; a thickness of the chucking unit is 0.8 mm; a height from the hub H to the disk surface is approximately 1.4 mm; and a thickness of the jacket J is 3.3 mm (the set values are all reported on [America] *American* National Standard X3B8-84-201). The upper head 40, which has already been standardized in the industrial field [fro] *for* use with the flexible disk drive unit, is set to 2.7 mm. The *upper head 40 of the* upper carriage 41 needs *to be spaced* at least 0.5 mm [enough to provide a shape] *away from the disk jacket J to prevent the head from being damaged or destroyed when inserting or removing the jacket J*.

Hence, the details of the minimum necessary thickness of the entire device are such that: a thickness of the motor M1 is 6 mm; a thickness of the chucking unit is 0.8 mm; a thickness of the disk is 1.4 mm; a half thickness of the jacket is 1.65 mm; a thickness of the upper head is 2.7 mm; and a thickness of the upper carriage is 0.5 mm. The device thickness is totally 13.55 mm.

In fact, however, tolerances of the respective components are produced, and therefore the clearance is required to be eliminated for preventing the interference. Since a shield or the like for preventing noises given from the outside is added, the thickness of the whole device can be set to approximately 16 mm. As a matter of fact, much the same thickness can be attained in this embodiment.

Turning to FIGS. 22 through 28, there are illustrated variant forms of the chucking mechanism, wherein the components having the identical functions are marked with [the] like symbols, and the explanatory repetition is therefore omitted herein.

Figure 22:
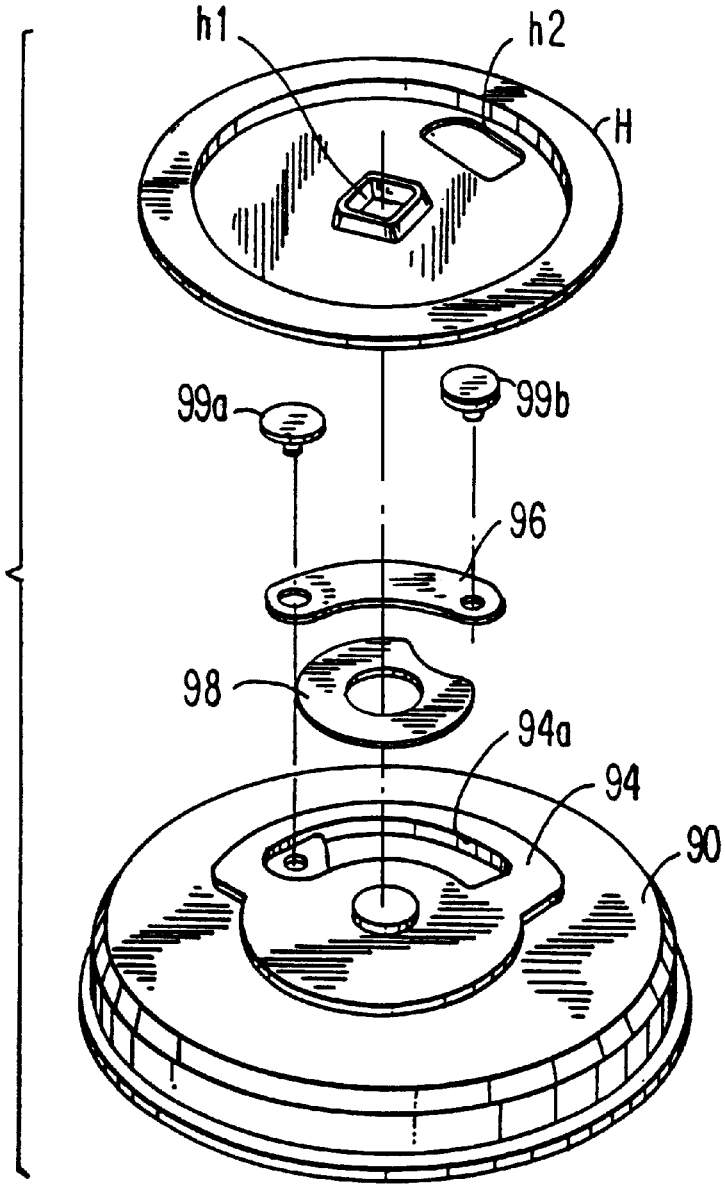
FIG. 22 is a perspective view showing a variant form of the chucking mechanism.

One end of the chucking lever 96 is, as shown in FIG. 22, rotatably fixed to the rotor 90 with a chucking lever pin 99a. A driving pin 99b is fixed to a free end of the chucking lever 96 by caulking. The chucking lever 96 is disposed in an opening 94a formed in the chucking magnet 94, and the rotor upper surface is formed with an opening corresponding to the opening 94a.

Figure 23:
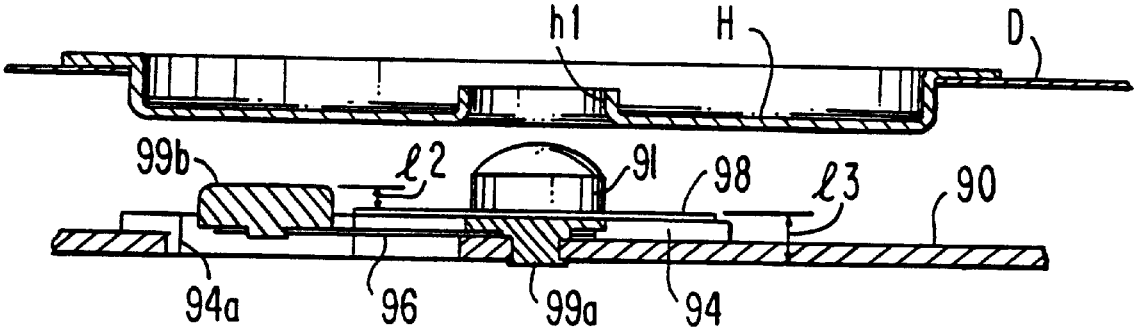
FIGS. 23 to 25 are sectional views each showing an operation of the chucking mechanism.

In a state where the disk D is not loaded on the rotor, as illustrated in FIG. 23, the driving pin 99b is protruded upwardly of a slide sheet 98. In this state, when the hub H of the disk D is adsorptively held onto the slide sheet 98 by the chucking magnet 94, ordinarily the driving pin 99b is pushed by the hub H and moves down due to deflection of the chucking lever 96 because of a small probability that the driving hole h2 of the hub H does not coincide with the position of the driving pin 99b. Note that the chucking lever 96 in this embodiment involves the use of a spring plate having a thickness of approximately 0.15 mm.

Figure 25:
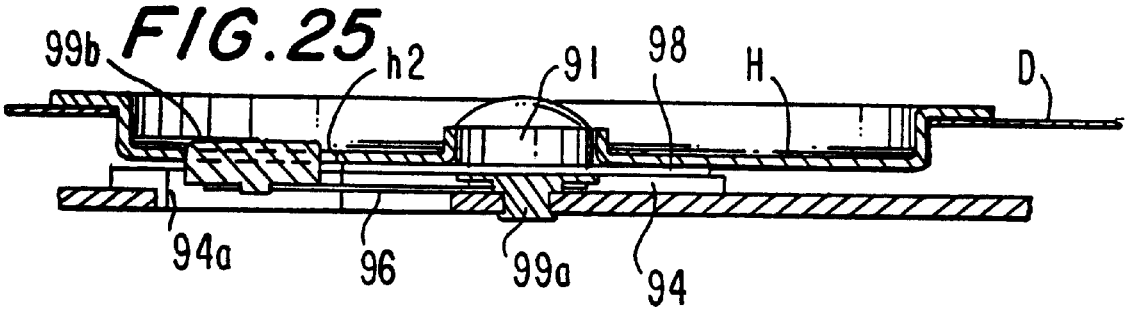

Subsequently, when the rotor 90 rotates in response to a motor driving signal, the driving hole h2 of the hub H is aligned with the driving pin 99b, and, as illustrated in FIG. 25, the driving pin 99b is protruded into the driving hole h2 by a restoring force of the chucking lever 96.

Figure 26:
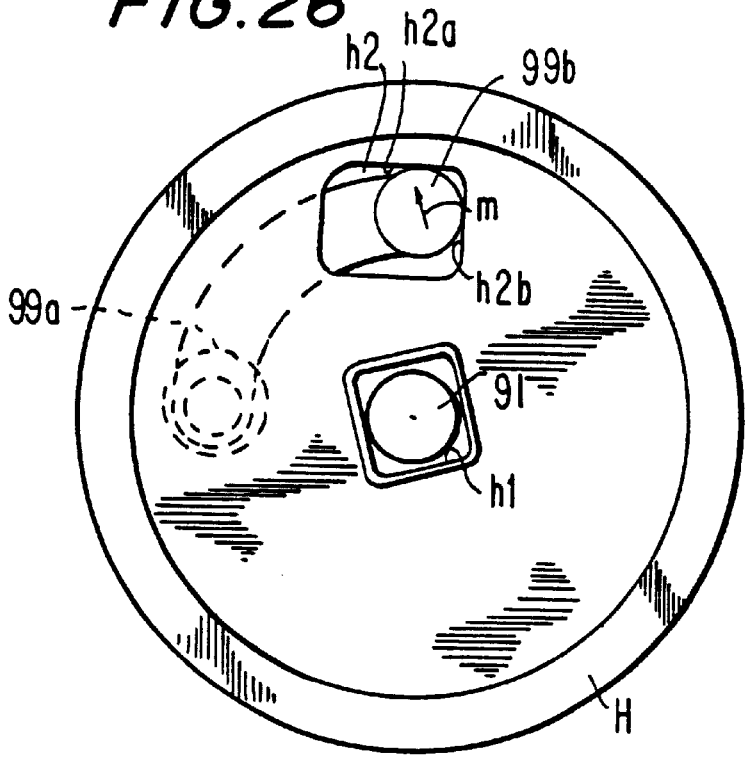
FIGS. 26 and 27 are plan views each showing a chucking action.
Figure 27:
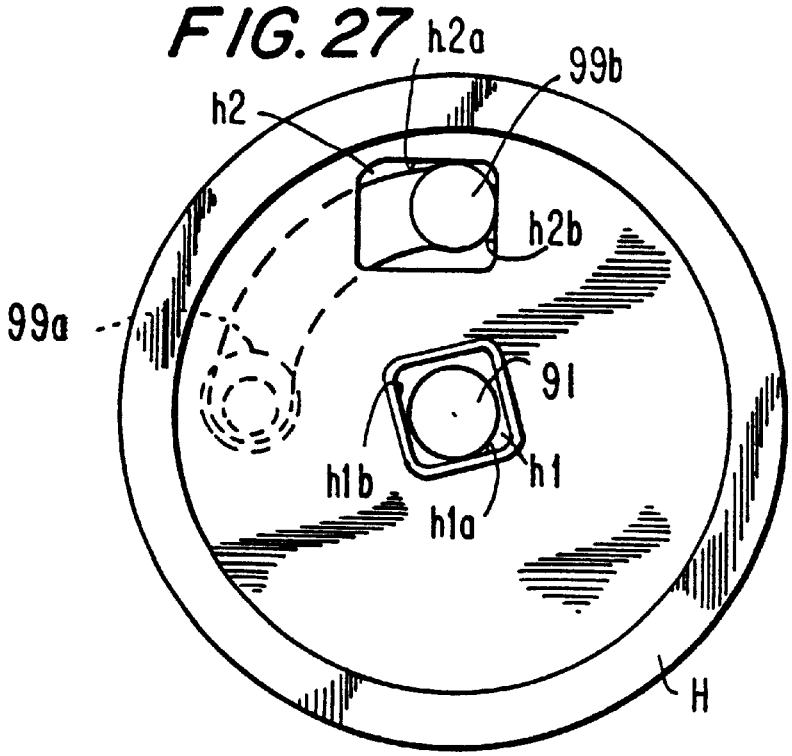

Besides, the driving pin 99b impinges and immediately engages with two surfaces h2a and h2b of the driving hole h2, with the result that the chucking lever 96 is rotationally moved in an arrowed direction m in [the Figure] *FIG. 26* by the disk rotary force. Then, two surfaces h1a and h1b of a central hole h1 of the hub H are pushed against the rotary driving shaft 91, thus centering the hub H (*FIG. 27*).

Figure 24:
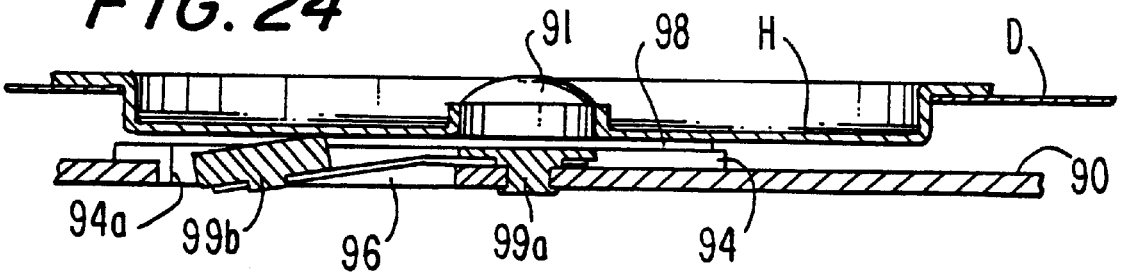
Figure 28:
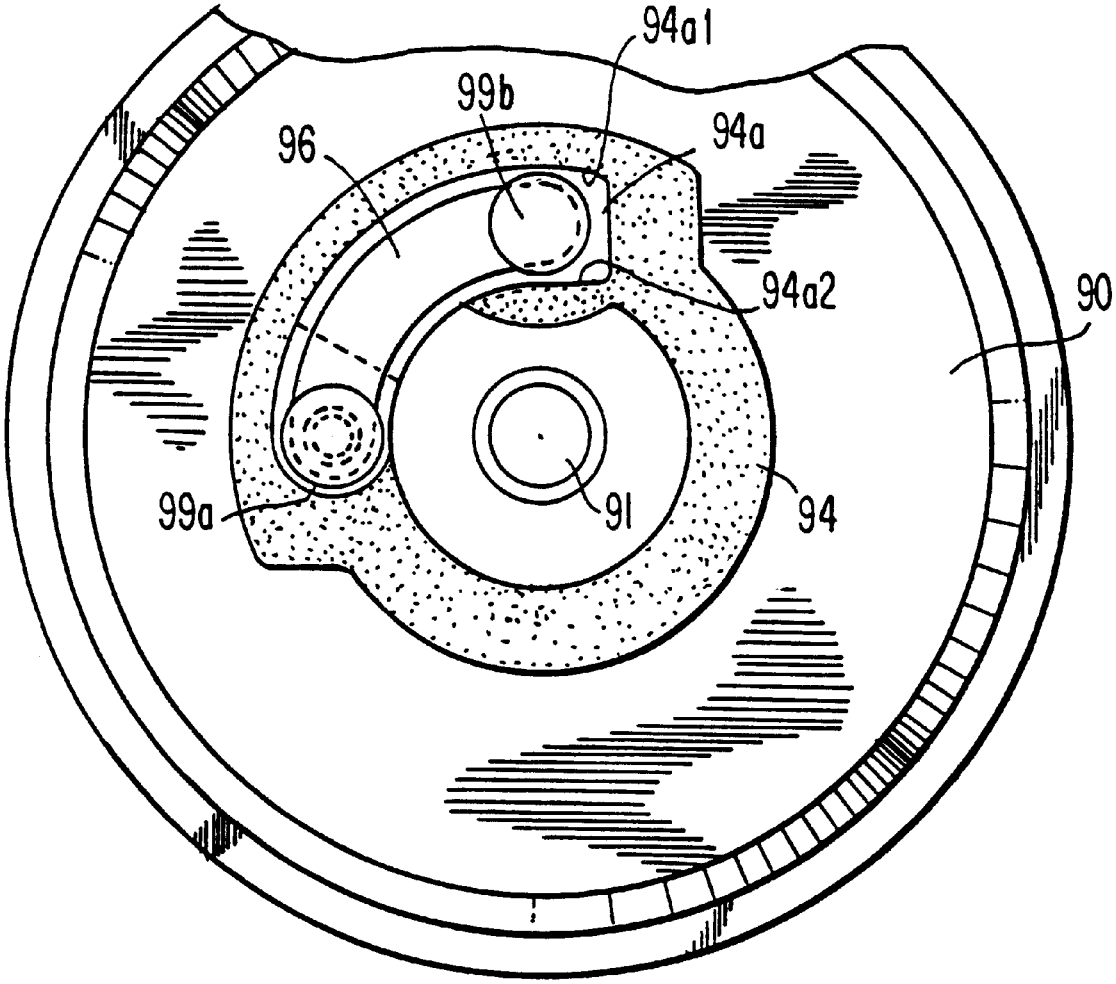
FIG. 28 is an enlarged plan view of the chucking mechanism.

It is to be noted that a rotary range of the chucking lever 96 is, as shown in FIG. 28, regulated by the rotor and by inner wall surfaces [94a 1] *94a1* and [94a 2] *94a2* standing vis-a-vis with each other in the radial direction of the circular arc opening 94a formed in the chucking magnet 94 to effect an exact engagement of the driving pin 99b with the driving hole h2. The chucking lever pin 99a, as depicted in FIG. 23, behaves to hold the chucking lever 96 while keeping the clearance of smaller than 0.1 mm to regulate the up-and-down motions of the chucking lever 96 in the Figure. A protrusion [quantity] *distance* 12 of the driving pin 99b from an upper surface of the slide sheet 98 is set lower than a thickness 13 obtained by adding thicknesses of the rotor 90, the chucking magnet 94 and the slide sheet 98. With this arrangement, when performing the chucking operation, the chucking lever is, as illustrated in FIG. 24, not protruded into the rotor 90. In addition, a sliding force of the driving pin 99b on the hub H can be decreased. It is also possible to reduce both the thickness of the chucking mechanism and a degree of defacing between the hub H and the driving pin 99b during the chucking operation.

Hence, as in the previous example, the motor M1 can be decreased in thickness similarly in the embodiment of FIGS. 22 to 28, which in turn leads to a reduction in thickness of the recording/reproducing device as a whole.

As discussed above, since the respective components of the recording/reproducing device have the above-mentioned constitutions, the thickness of the entire device can be set to at least 20.5 mm or under. Especially in the foregoing embodiment, the thickness can, as stated earlier, be reduced down to about 16 mm. This reduction conduces to a remarkable decrease in space for incorporating the device in an electronic appliance like, e.g., a computer.

As described above, the arrangement that the device thickness is set to less than 20.5 mm makes the following placement geometries practicable in the case of mounting the recording/reproducing device 1 of the present invention in the electronic appliance such as a computer or the like.

FIGS. 29 to 37 show configurations in which the recording/reproducing device 1 based on the above-mentioned floppy disk drive (FDD) serving as an external storage unit is incorporated into a computer-based electronic appliance.

Referring *to* FIGS. 29 through 32 and 36, an external storage unit 101 of the electronic appliance is constructed in the following manner. Two sets of recording/reproducing devices 1 each employing, for example, a miniaturized 3.5-inch FDD are mounted in a chassis 102 made by machining, e.g., a steel sheet to have the same size and fitting structure as those of a chassis of, e.g., a conventionally used 5-inch FDD. Attached to the front surface of the chassis 102 is a front bezel 104 having almost the same size as that of, e.g., the 5-inch FDD and formed with insertion ports 104a (illustration is omitted in FIGS. 29 through 32) for mounting 3.5-inch disks, corresponding to two sets of recording/reproducing devices 1.

Figure 36:
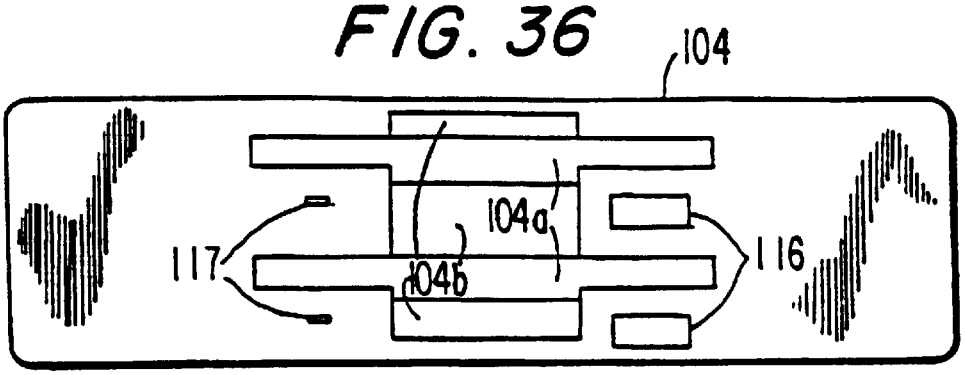

Turning to FIG. 36, the front bezel 104 includes a recess 104b suitable for inserting and removing the 3.5-inch disk, the recess 104b being formed substantially in the vicinity of the insertion port 104a. There are also equipped a button 118 for ejecting the 3.5-inch disk and an LED 117 for displaying working conditions of the recording/reproducing device 1.

A structure of attaching the front bezel 104 to the front surface of the chassis 102 entails the steps of firstly shaping a fixing member 104b on the front bezel 104 to fix the front bezel [104to] *104 to* a bottom surface of the chassis 102 formed to assume a substantially U-like shape, forming key-like engaging members 102b, provided at upper ends of both side surfaces of the chassis 102, for sustaining the front bezel 104 so as not to be inclined forward, providing hook members 104c engaging with the engaging members 102b on the front bezel 104, engaging the engaging members 102b with the hook members 104c, and finally fixing the front bezel 104 to the bottom surface of the chassis 102 with screws 119.

A specific structure of incorporating two sets of recording/reproducing devices 1 into the chassis 102 will be mentioned in greater detail. Substantially perpendicular side walls 102*a* serving as a part of the chassis 102 are formed on a part of both side surfaces of the recording/reproducing device 1 and then fixed thereto with a plurality of screws 106.

Located [in] *at a* rear of the recording/reproducing device 1 is a relay board invested with an interface function identical with that of, e.g., the 5-inch FDD, this function being different from a commonly used interface function which is standardized for use with a 3.5-inch recording/reproducing device.

The relay board works differently in accordance with contents shown in FIGS. 29 through 32. The contents will be explained respectively.

Figure 29:
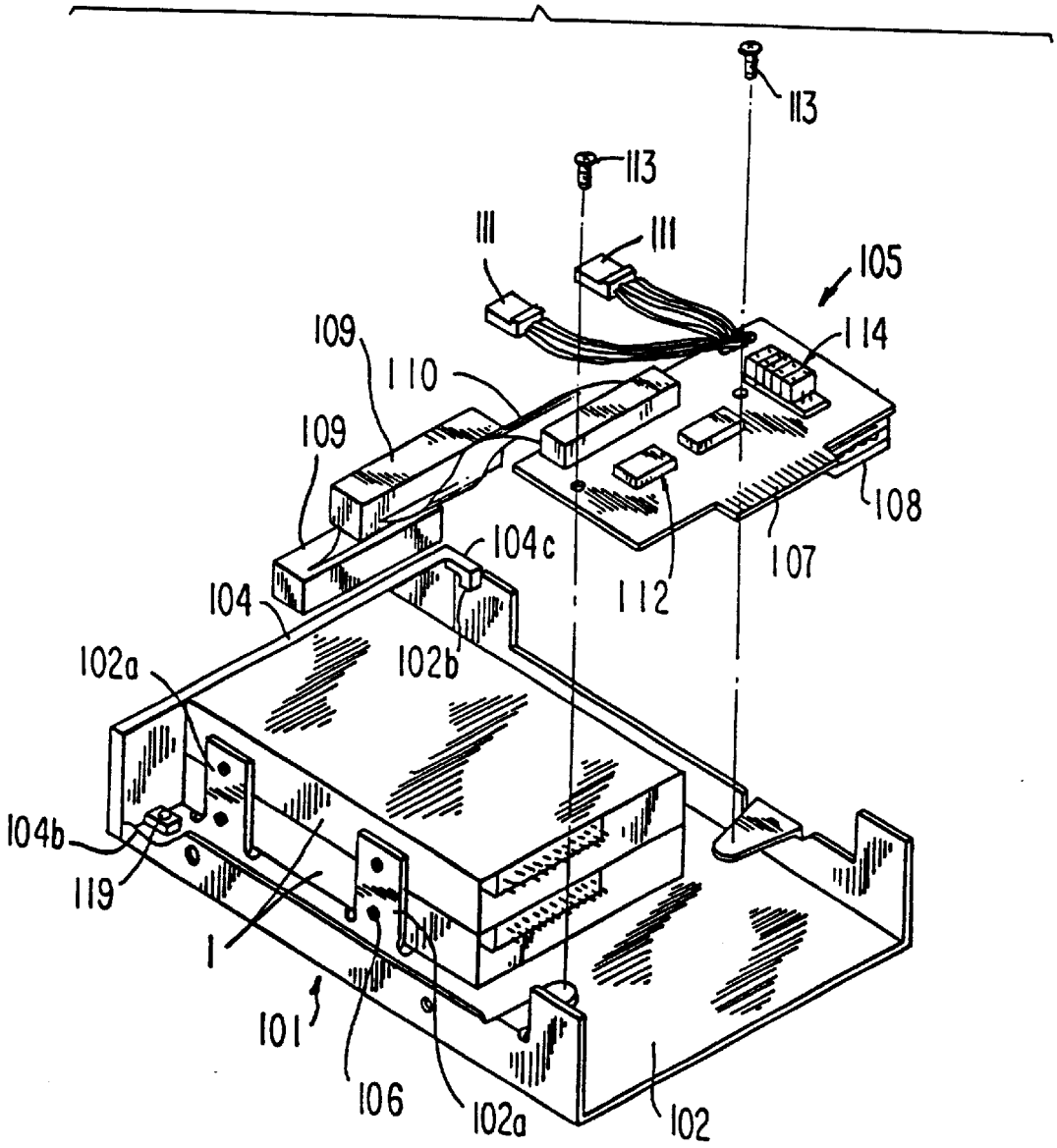
FIGS. 29 through 32 are exploded perspective views each illustrating a configurational example where the recording/reproducing device of the invention is incorporated into an electronic appliance such as a computer.

(1) A relay board 105 depicted in FIG. 29 includes: a card edge connector 107, connected to a host-side connector, for receiving and transferring signals; a power supply connector 108 supplied with electric power; connectors 109 connected to each of two sets of recording/reproducing devices 1, for receiving and transferring the signals, and also provided at an end of a flat cable 110; and two pieces of [poser] *power* supply terminals 111, connected *to* each of two sets of recording/reproducing devices 1, for supplying the electric power. The relay board 105 is fixed to the chassis 102 with screws 113.

The relay board 105 is equipped with a driving element 112 for increasing a current driving ability of an output signal of the 3.5-inch recording/reproducing device 1 up to a current value of the 5-inch FDD. The relay board 105 also has, e.g., a plurality of short plugs 114 as selective setting means for selectively setting a driving state of the 3.5-inch recording/reproducing device 1 or selectively setting the specifications thereof.

Figure 30:
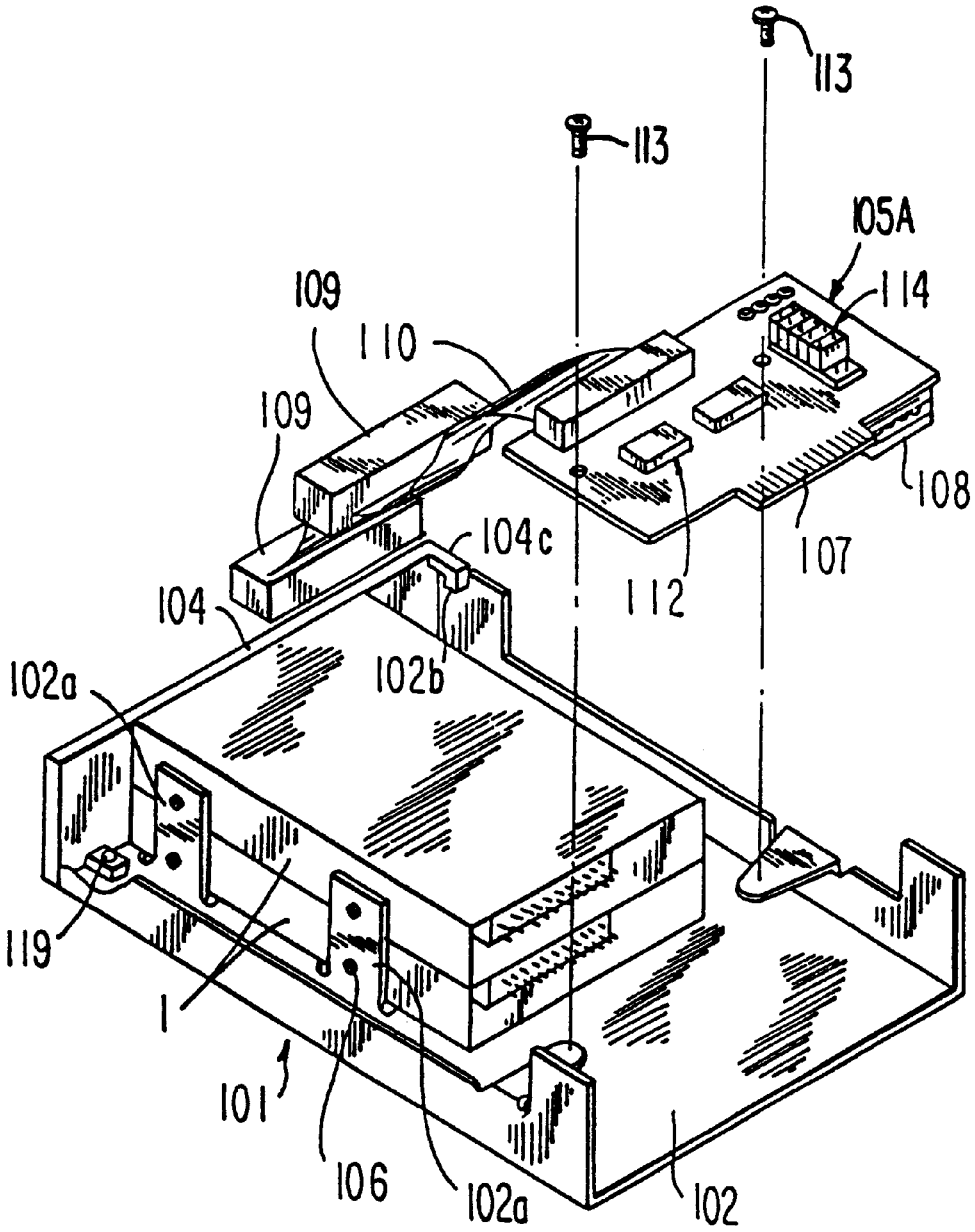

(2) A different arrangement of a relay board 105A depicted ion FIG. 30 from the relay board 105 of FIG. 29 is that there are not provided two pieces of power supply terminals 11, connected to each of two sets of recording/reproducing devices 1 shown in FIG. 29, for supplying the electric power, and instead, the electric power is supplied via two pieces of connectors 109 disposed at the end of the flat cable 110.

Other constructions are the same as those shown in FIG. 29. The relay board 105A includes: the card edge connector 107, connected to the host-side connector, for receiving and transferring the signals; the power supply connector 108 supplied with the electric power; and two pieces of connectors 109, connected to each of two sets of recording/reproducing devices 1, for receiving and transferring the signals, and located at the end of the flat cable 110 for supplying the electric power. The relay board 105A is fixed to the chassis 102 with the screws 113.

The relay board 105A is equipped with the driving element 112 for increasing a current driving ability of an output signal of the 3.5-inch recording/reproducing device 1 up to a current value of the 5-inch FDD. The relay board 105A also has, e.g., a plurality of short plugs [11A] *114* as selective setting means for selectively setting a driving state of the 3.5-inch recording/reproducing device 1 or selectively setting the specifications thereof.

Figure 31:
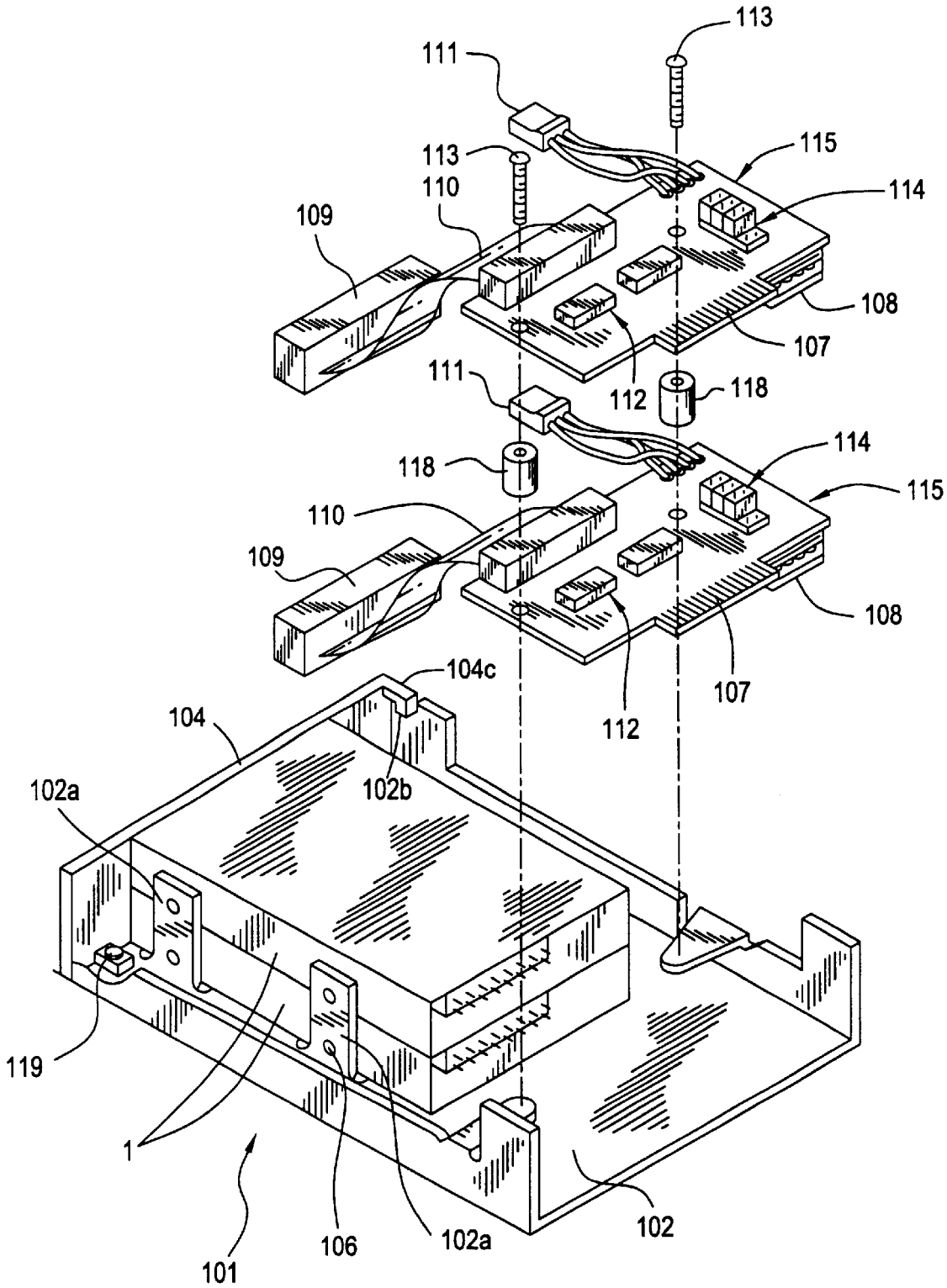

(3) A big difference between a relay board 115 shown in FIG. 31 and the relay boards 108 and 105A depicted in FIGS. 29 and 30 is that two sheets of relay boards 114 are provided corresponding to two sets of recording/reproducing devices 1. Other constructions are the same as those shown in FIG. 29. Each of the two relay boards 115 depicted ion FIG. 31 has: the card edge connector 107, connected to the host-side connector, for receiving and transferring the signals; the power supply connector 108 supplied with the electric power; the connectors 109, connected to each of the two recording/reproducing devices 1, for receiving and transferring the signals, and located at the end of the flat cable 110; and power supply terminals 111, connected to the recording/reproducing devices 1, for supplying the electric power. Set between the relay boards 115 is a bush 118 which is in turn fixed to the chassis 102 with the screws 113.

Each of the relay boards 115 is equipped with the driving element 112 for increasing a current driving ability of an output signal of the 3.5-inch recording/reproducing device 1 up to a current value of the 5-inch FDD. The relay board 115 also has, e.g., a plurality of short plugs 114 as selective setting means for selectively setting a driving state of the 3.5-inch recording/reproducing device 1 or selectively setting the specifications thereof.

Figure 32:
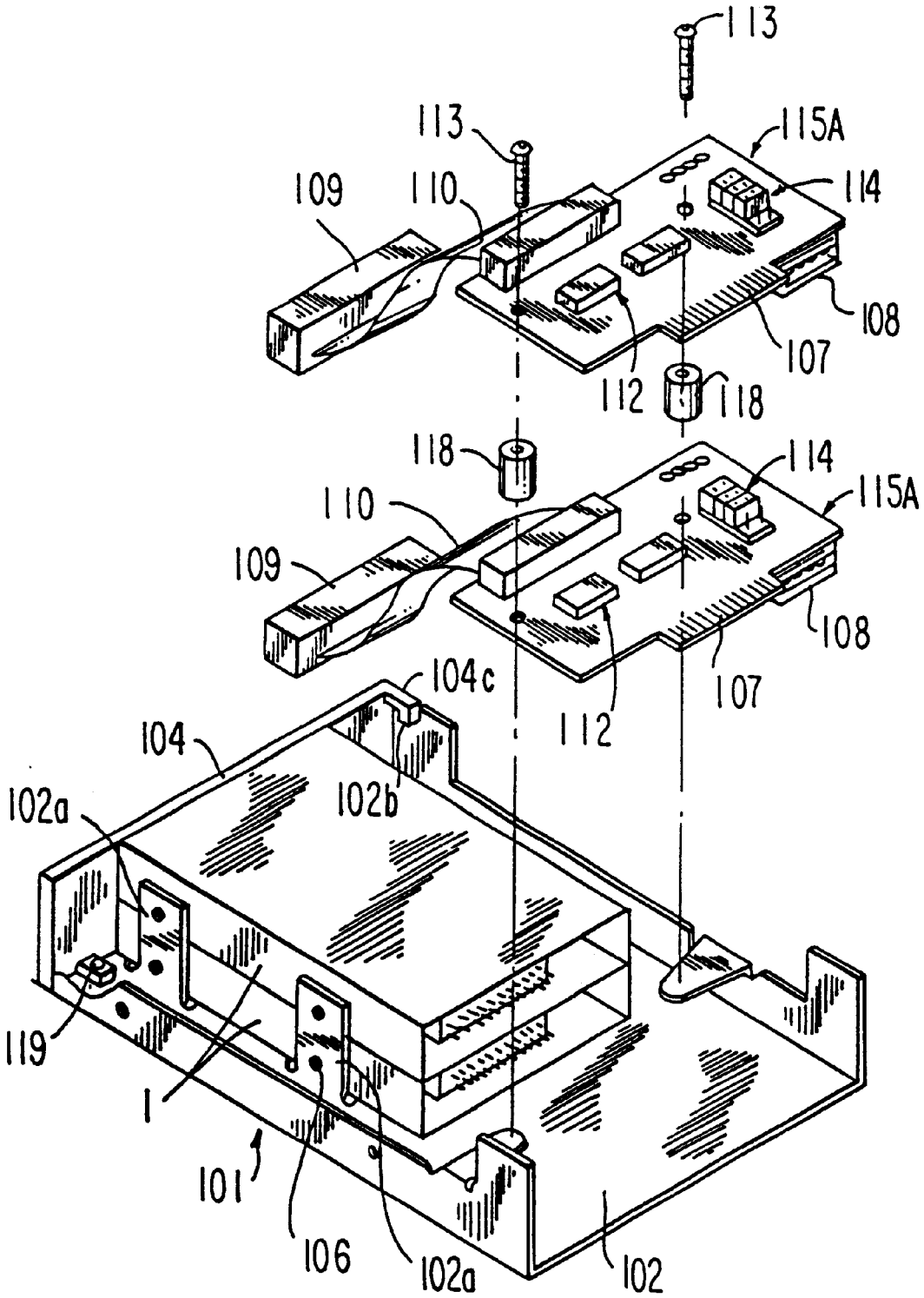

(4) A different arrangement of the relay board 115A depicted in FIG. 32 from the relay board 115 of FIG. 31 is that there are not provided the power supply terminals 111, connected to the recording/reproducing devices 1 shown in FIG. [51] *31*, for supplying the electric power, and instead, the electric power is supplied via the connectors 109 disposed at the end of the flat cable 110.

Other constructions are the same as those shown in FIG. 31. The relay board 115A includes: the card edge connector 107, connected to the host-side connector, for receiving and transferring the signals; the power supply connector 108 supplied with the electric power; and the connectors 109, connected to each of two sets of recording/reproducing devices 1, for receiving and transferring the signals, and located at the end of the flat cable 110 for supplying the electric power. Set between the relay boards 115A is the bush 118 which is fixed to the chassis 102 with the screws 113.

The relay board 115A is equipped with the driving element 112 for increasing a current driving ability of an output signal of the 3.5-inch recording/reproducing device 1 up to a current value of the 5-inch FDD. The relay board 115A also has, e.g., a plurality of short plugs 114 as selective setting means for selectively setting a driving state of the 3.5-inch recording/reproducing device 1 or selectively setting the specifications thereof.

Figure 33:
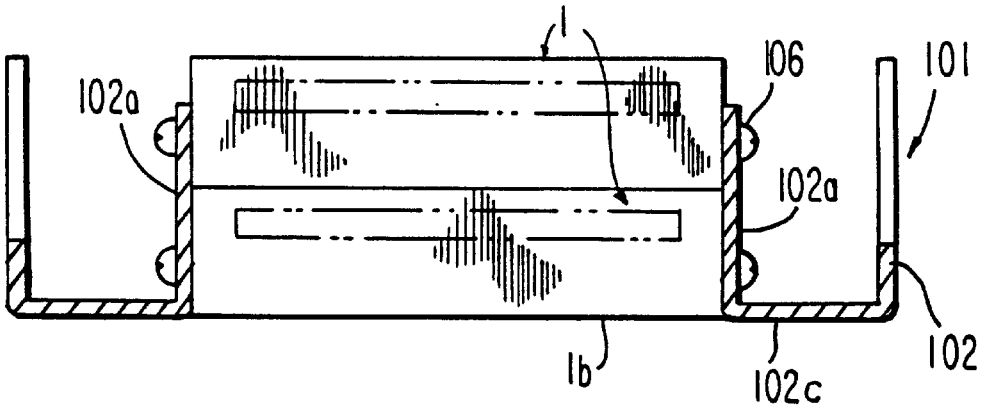
FIGS. 33 to 35 are front elevations in vertical section, each illustrating a state where the recording/reproducing device of the invention is incorporated into the electronic appliance.
Figure 34:
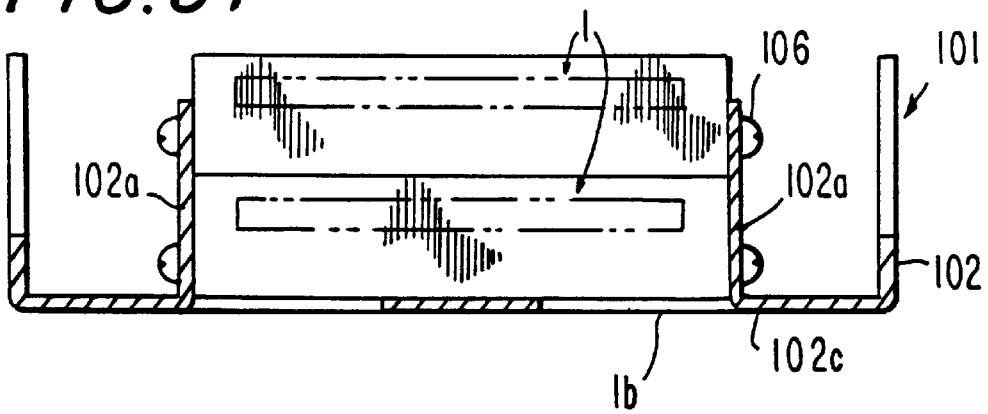
Figure 35:
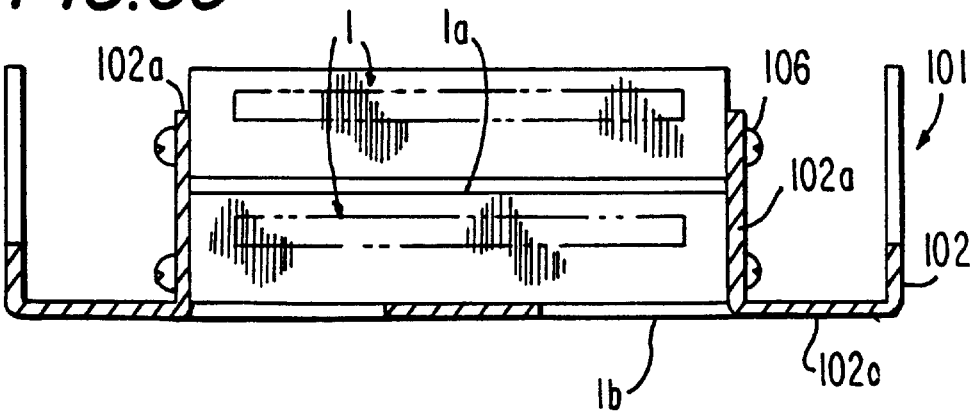

Next, a structure of fixing the 3.5-inch recording/reproducing device 1 to the chassis 102 will be explained in conjunction with FIGS. 33 to 35. Referring to FIGS. 33 through 35, the chassis 102 constructed by machining, e.g., a steel sheet to have almost the same size and fitting structure as those of the chassis of the 5-inch FDD is formed inside with nearly perpendicular side walls 102*a* shaped by effecting, e.g., a bending process so as to substantially match with the side surfaces of the recording/reproducing device 1. Two sets of miniaturized 3.5-inch recording/reproducing devices 1 are installed between the side walls 102*a* and then fixed thereto with a plurality of screws 106.

Turning attention to a relationship between the chassis 102 and the two 3.5-inch recording/reproducing devices 1 incorporated between the side walls 102*a,* a bottom surface 102*c* of the chassis 102 almost accords with a bottom surface 1*b* of the recording/reproducing device 1 in FIG. 33 and the two 3.5-inch recording/reproducing devices 1 are so mounted as to be superposed on each other.

On the other hand, turning to FIG. 34, the recording/reproducing device 1 disposed inwardly of the chassis 102. The bottom surface 102*c* of the chassis 102 deviates by a thickness of the chassis 102 from the bottom surface 1*b* of the recording/reproducing device 1. Two sets of 3.5-inch recording/reproducing devices 1 are so installed as to be superposed on each other.

Referring to FIG. 35, the recording/reproducing devices 1 are, as in the case of FIG. 34, disposed inwardly of the chassis 102. Formed between the two 3.5-inch recording/reproducing devices 1 is a space 1*a* by which to prevent deteriorations of the recording/reproducing devices which are caused by interactions of noises of magnetic and electric fields generated by the two recording/reproducing devices 1 or resonances derived from interactions of working sounds of both of the recording/reproducing devices 1 even under an excessively dense state of placement.

Note that the structures, shown in FIGS. 33 to 35, of fixing the 3.5-inch recording/reproducing devices 1 to the chassis 102 are different from each other but do not present essential difference in terms of their recording/reproducing functions.

On the basis of such a construction, for instance, a 5-inch FDD is completely replaceable with the recording/reproducing device 1 of the present invention in a variety of electronic appliances each loaded with the 5-inch FDD.

Next, constitutional characteristics of the above-mentioned embodiment will be given as follows:

1) The number of recording/reproducing devices incorporated

In the foregoing embodiment, there are installed two sets of 3.5-inch recording/reproducing [r] devices 1, and two pieces of respective relay boards 105, 105A, 115 and 115A. The front bezel 104 is formed with the insertion ports 104*a* for mounting the 3.5-inch disks, corresponding to the two recording/reproducing devices 1. As a matter of course, however, the number of the devices is not limited to two. The gist of the embodiment can also be attained by providing these components singly.

2) Thickness of recording/reproducing device

As stated before, the recording/reproducing devices such as FDDs, HDDs, ODDs and tape streamers which have widely been spread as external storage units of multiple computer-based electronic appliances are substantially standardized in their sizes of outer shapes and fitting dimensions thereof depending on sizes of the recording mediums. The standardization has been carried out on the basis of the FDDs. Under such circumstances, the description in this embodiment has been developed so far by exemplifying the FDD for explanatory convenience.

Now, a descriptive emphasis will be placed on the contents of standardization.

The competitors have expanded their technical activities aiming at a reduction in the device thickness from an early stage at which the FDDs came out on the market. As a result, a dominant type of FDDs of nowadays are 5-inch FDDs each having a thickness 41 mm and 3.5-inch FDDs each having a thickness of 28.5 mm [(1 inch)]. These FDDs are interchangeable with respect to the recording/reproducing operations.

While on the other hand, the current tendency for more miniaturized and thinner devices is giving an acceleration to the technology wherein the most popular FDDs having the device thickness of 25.4 mm (1 inch) will be developed into FDDs having a mechanism thickness of 12.7 mm (½ inch) that is one-half the former. This is a big target among the competitors.

In accordance with the embodiment of the invention, however, the mechanism thickness is set from another point of view. The present invention aims at incorporating two sets of 3.5-inch recording/reproducing devices into the same space as that of the 5-inch FDD having a device thickness of 41 mm which is now spread over most widely. In the structure of mounting the 3.5-inch recording/reproducing devices depicted in FIGS. 33 to 35, these devices are not limited to unitized devices such as the FDDs. If preferably unitized, it is convenient to handle the FDD as one unit even when separating it from the chassis 102.

When mounting two sets of 3.5-inch recording/reproducing devices in the chassis 102 having the same thickness as a device thickness, 41 mm, of the most popular 5-inch FDD, in the fitting structure shown in FIG. 33, a preferable thickness of the 3.5-inch recording/reproducing device is approximately 20.5 mm. In the fitting structure depicted in FIG. 34, a thickness of the chassis 102 is set to approximately 4 mm, and if some scatter is to be considered, a preferable thickness of the 3.5-inch recording/reproducing device is about 18 mm.

In the fitting structure illustrated in FIG. 35, if the space 1*a* is formed as large as possible, there are, as a matter of course, reduced the influences exerted by noises of the foregoing electric and magnetic fields and by operating sounds. Supposing herein that there exists, more or less, scatter by setting the space 1*a* to, e.g., 4 mm or thereabouts and the thickness of the chassis 102 to approximately 2 mm, a preferable thickness of the 3.5-inch recording/reproducing device is approximately 17 mm.

Note that there may be prepared, though not illustrated in FIG. 35, a shield member for shielding the noise of the electric and magnetic fields in the space 1*a,* or a sound absorbing member for preventing the resonance by absorbing the operating sounds, or a damper member having, e.g., viscous and elastic properties. This arrangement further improves the desired functions thereof.

3) Method of attaching the bezel

For the purpose of making the positional relationship accordant between the disk insertion port 104*a* of the front bezel 104 and the recording/reproducing device 1 when inserting device 1 therein, it is typically preferable to [atta-che] *attach* the front bezel 104 to the recording/reproducing device 1. In this embodiment, however, the key-like engaging members 102*b* are, as discussed above, shaped at upper ends of both side surfaces of the chassis 102 with a view to sustaining the front bezel 104 so as not to be inclined forward. The front bezel 104 is provided with the hook members 104*c* engaging with the engaging members 102*b*. After engaging the engaging members 102*b* with the hook members 104*c,* the front bezel 104 is fixed to the bottom surface of the chassis 102 with the screws 119, thus providing a firm fixing structure. Based on this structure exhibiting a sufficient strength, even when grasping only the front bezel 104 during, e.g., a handling operation, no deformation is caused.

In this embodiment, the holding means for sustaining the front bezel 104 so as not to slant forward involves the use of the hook members 104*c* of the front bezel 104 which engage with the key-like engaging members 102*b* shaped at the upper ends of both side surfaces of the chassis 102. The mode of engagement is not, however, confined to the above-mentioned. A possible engaging mode (not shown) is that, for instance, the front bezel 104 is engaged with the chassis 102 from inside.

The front bezel 104 is attached to the chassis 102 in the foregoing embodiment. The construction may, however, exclude the front bezel 104. Instead, for example, an outer case of an electronic appliance like a computer may be formed with a disk insertion port.

4) Construction of relay board

The relay boards 105 and 105A are singly provided in FIGS. 29 and 30. Whereas in FIGS. 31 and 32, there are provided the relay boards 115 and 115A by twos. These arrangements do not present a functional difference therebetween. This simply implies that the one-sheet construction of the relay boards 105 and 105A decreases the costs, while two-sheet construction of the relay boards 115 and 115A exhibits a versatility of combination because of separability per unit by combining the boards with the recording/reproducing devices.

On the other hand, each of the relay boards 105, 105A, 115 and 115A includes the driving element 112 for increasing the current driving ability [of-the] *of the* output signal of the 3.5-inch recording/reproducing device 1 up to a current value of the 5-inch FDD[,]. If the current of values on both sides are equal, there is no necessity for providing the driving element 112.

5) Connection of relay board to recording/reproducing device

Referring to FIGS. 29 and 30, the electric power is supplied from the relay boards 105 and 115 via the power supply terminal 111 to the recording/reproducing device 1. In FIGS. 30 and 32, the electric power is fed from the relay boards 105 and 115A via the flat cable 110 to the recording/reproducing device 1. These arrangements do not bring about any functional difference therebetween. This simply implies that the supply of electric power via the connectors 109 disposed at the end of the flat cable 110 leads to a drop in costs of construction, while the supply of electric power through the power supply terminal 111 has a good versatility of combination. It is because the latter arrangements accords with an electric power supplying method of the conventionally standardized 3.5-inch recording/reproducing device 1 which [doe] *dues* not include special circuitry.

In the prior art example disclosed in Japanese Utility Model Laid-Open Publication No.63-11792, the relay boards are connected directly to the recording/reproducing devices through the connectors, which requires accurate positioning therebetween. In the foregoing embodiment, however, the connection is made through the flat cable 110, and hence the necessity for the precise positioning process therebetween is eliminated. Besides, it is easy to change the combinations of the recording/reproducing devices 1 and the relay boards 105 and 115 or the recording/reproducing devices 1 and the relay boards 105A and 115A. The combinations can be diversified by anyone according to the purposes.

6) Placement of relay board of selective condition setting means:

Each of the relay boards 105, 105A, 115 and 115A which are shown in FIGS. 29 through 32 has a plurality of short plugs serving as selective condition setting means for selectively setting a driving state (typically referred to as a drive select) of the 3.5-inch recording/reproducing device [i] *1* or selectively the specifications thereof. Assuming that the above-mentioned selective condition setting means are incorporated into the 3.5-inch recording/reproducing devices shown in FIGS. 29 to 32, the devices 1 are reduced in their thickness, and hence the selective positions have to be set in the confined space. This causes a deterioration in handling the condition setting process. Whereas in the illustrative embodiment of the present invention, the selective condition setting means are provided on the relay boards 105, 105A, 115 and 115A each having a sufficient space, thereby showing an extremely good state of handling the condition setting process.

One available arrangement, catered for a completely different application, of the short plugs 114 is that the plugs are used as test terminals for electrically monitoring, e.g., a driving state of the recording/reproducing device 1. In connection with the test terminals for electrically monitoring the driving state thereof, there [mat] *may* be provided, e.g., pattern lands on the relay boards 105, 105A, 115 and 115A having a large space as completely different electric monitoring means.

The foregoing illustrative embodiment has dealt with a plurality of short plugs [11] *114* as selective condition setting means. Another available selective condition setting means may be switching means like, e.g., slide switches.

As discussed above, in the relay boards 105, 105A, 115 and 115A having the sufficient space, there are provided the controlling means for electrically controlling the recording/reproducing device 1 as in the case of selectively setting both the driving state of the recording/reproducing device 1 and the specifications thereof and further electrically monitoring the driving state. This arrangement yields a good handling property for setting the control conditions.

The characteristics of geometries in which the recording/reproducing devices 1 shown in FIGS. 29 through 36 *are provided* have been described thus far. The explanation will next be focused on effects obtained when incorporating the thus constructed recording/reproducing devices into, e.g., a computer and utilizing the device therein by way of one example with reference to FIG. 37 illustrating the computer in perspective.

Turning to FIG. 37, the numeral 121 designates a computer device body, into which a variety of electronic units, for effecting electric processes; 122 a display for displaying on the basis of commands issued from the computer device body 121; and 123 a keyboard for inputting the commands to the device body 121.

The computer device body 121 is mounted with two sets of 5-inch FDDs 124 as external storage units and one 5-inch HDD 125. The computer device body 121 includes a preparatory mounting area 126 *large* enough to accommodate one additional external storage unit. The computer device body 121 receives software and data transferred from the 5-inch FDDs 124 or from the 5-inch HDD 125 or performs predetermined processes upon receiving the data. Excepting its functions and capability, a processing function and capability depend on a storage capacity and a data transferring velocity of the external storage unit.

Under such circumstances, there are made a good number of contrivances for the purpose of ameliorating the processing function and capability of the computer device body 121. Much attention will be paid to an effective method which involves combinations of the external storage units incorporated into the computer device body 121.

As previously stated, the external shape sizes, fitting dimensions and electrically connected interfaces of the FDDs, HDDs, ODDs and tape streamers, which have been standardized and thereby spread over as external storage units of multiple electronic appliances, are substantially standardized in conformity with sizes of respective recording mediums. On the other hand, the computers are in general constructed to exhibit a functional expandability. Take a device body of FIG. 37 for instance, the computer device body 121 is invested with minimum standard functions which characterize the system. For expanding the functions, there are prepared in advance connecting functions (not shown) to, e.g., additional slots of an electronic circuit board and to a variety of appliances to facilitate the functional expansions according to the purposes. Consequently, it is easy to combine or replace the external storage units mounted in the computer device body. The processing function and capability can be expanded according to the constitutional purposes of the system. Although the recording/reproducing devices shown in the prior art examples are appearing, the drawbacks to the installation thereof remain unsolved. Hence, the recording/reproducing devices in this embodiment [care] *are* capable of increasing a degree of freedom for combinations of the external storage units and obviating such drawbacks inherent in the installation thereof.

Referring to FIG. 37, the combinations or replacement and installation of the external storage units incorporated in the computer device body 121 will concretely be described.

The computer device body 121 depicted in FIG. 37 has a quite typical construction and is mounted with two 3.5-inch FDDs 124 which are commonly used for loading or copying commercially available software and backing up the data. The 5-inch HDDs 125, which store a good deal of software and data, perform a function to effect a high-speed transfer to the computer device body 121.

On the occasion of a usable functional expansion of the software recorded on the 3.5-inch recording medium, the 5-inch FDDs 124 are removed, and instead there is taken a method of mounting the recording/reproducing devices each having a recording/reproducing mechanism. In the prior art recording/reproducing devices, however, if the 5-inch FDDs 124 are taken away, the 5-inch recording/reproducing function can not be accomplished.

To cope with this, in accordance with the embodiment of the present invention there are employed two sets of 3.5-inch recording/reproducing devices, and the following arrangement will be adopted.

(1) One of the two 5-inch FDDs 124 is removed, and, as described above, even when the FDD 124 is replaced with the two miniaturized 3.5-inch recording/reproducing devices 1, the 5-inch recording/reproducing function can be fulfilled because of the single 5-inch FDD 124 being left. Moreover, the preparatory mounting area 126 remains as it is for mounting the additional external storage unit.

Note that the function of the single FDD may generally suffice in the computer device body loaded with the HDDs.

(2) If the device body is loaded with no 5-inch HDD 125 (in some cases the preparatory mounting area 126 is not provided), and when mounting two sets of 3.5-inch recording/reproducing devices in this embodiment, there will be produced no obstacle to the 5-inch recording/reproducing functions, because the two 5-inch FDDs 124 are left as they are.

(3) Supposing that no preparatory mounting area 126 is formed in the device body mounted with only two 5-inch FDDs 12, and when one of the 5-inch FDDs 124 taken away is replaced with the two 3.5-inch recording/reproducing devices of this embodiment, a single set of 5-inch FDD 124 is left; or alternatively this-permits incorporation of other external storage unit.

(4) If no mounting area 126 is provided in the computer device body mounted with only one 5-inch FDD 124, one of the 5-inch FDDs 124 taken away is replaced with two sets of 3.5-inch recording/reproducing devices of this embodiment. In this case, the function of the computer device body incorporating the two 3.5-inch recording/reproducing devices can be expanded with almost no modification added to the computer device body.

[(54)] (5) As a matter of course, the two 5-inch FDDs 124 and one 5-inch HDD 125 stand as they are. Where the two 3.5-inch recording/reproducing devices are mounted in the preparatory mounting area 126, there will be caused no obstacle to the conventional recording/reproducing function.

By utilizing the arrangement given above, the two 3.5-inch recording/reproducing devices can be incorporated into the space the size of which is substantially equal to the conventional standardized 5-inch FDD 124. Hence, the usable functional expansion of the software recorded on the 3.5-inch recording mediums can be effected. In that case, the function can be expanded with facility without causing obstacles to the conventional recording/reproducing function as well as by effecting no improvement or modification with respect to the hardware of the computer device body 121.

The foregoing embodiment has exemplified a case where the functional expansion is executed in the conventional system. As a matter of course, in a novel system, however, it is much easier to exhibit many characteristics discussed above. In this embodiment, the explanation has been made by exemplifying the 5-inch and 3.5-inch FDDs. It is, of course, obvious that the arrangement is not limited to the combinations of these FDDs. The combination may be diversified like this;, for instance, 5-inch FDDs and 3.5-inch FDDs, or 8-inch FDDs and 5-inch FDDs. These changes in combination mode can be applied to HDDs and ODDS.

INDUSTRIAL APPLICABILITY

As discussed above, the recording/reproducing devices in accordance with the present invention can remarkably be miniaturized and particularly reduced in the device thickness. When employing the devices as external storage units for electronic appliances such as computers, the space for placement can be diminished to the greatest possible degree, thereby miniaturizing the electronic appliance as a whole. It is also possible to increase degrees of freedom both of placement of the [recoding] *recording*/reproducing devices-and of design. In particular, since the thickness of the recording/reproducing device is[,] set to 20.5 mm or under, for example, the two 3.5-inch recording/reproducing devices according to the present invention can be incorporated in place of the 5-inch recording/reproducing devices which have hitherto been constituted to have a thickness of typically 41 mm. General purposes of this type of recording/reproducing device can *be* considerably enlarged. Therefore, as mentioned earlier, the recording/reproducing device is effective in the case of making usable a different standard, e.g., 3.5-inch recoding medium in the electronic appliance which employs the 5-inch recording medium or in the case of making usable both of the [recoding] *recording* mediums of different standards. Especially, the 3.5-inch recording medium presents a high reliability in handling as compared with the 5-inch recording medium. For this reason, a capacity of the 3.5-inch recording/reproducing device is lately increased with acceleration. Under such circumstance, the present invention is suitable for a development of the software technology, and software unattainable by the software recorded on the [convectional] *conventional* 3.5-inch recording medium can be actualized.

The essentiality in the software technology, even though overwhelmingly advanced new techniques are introduced, lies in interchangeability with the software which has hitherto been accumulated or in continuous operability of the conventional software. The present invention is concerned with this point and therefore [deal] *deals* with free systematization of the FDDs, HDDs, ODDs and tape streamers which have been standardized and [the] spread over as external storage units of a variety of electronic appliances in association with the software techniques. Consequently, it is feasible to obtain the interchangeability with the conventionally accumulated software or the operability of the conventional software and further to develop the software technology business aiming at facilitating an expansion of total system. With a view to expanding the functions of [convectional] *conventional* system, it is possible to develop new and easy-to-diversify businesses which can not be seen in the past but facilitate the expansion of total system by simple and inexpensive means without requiring both tremendous investments of assets and high special hardware techniques, these businesses including, for instance, a unit sale business associated with the [recoding] *recording/* reproducing devices shown in the foregoing embodiment, a set sale business of the recording/reproducing devices and related software techniques, a set sale business of the recording/reproducing devices and other external storage units or a set sale business of the recording/reproducing devices and the function expanding circuit boards.

Although the illustrative embodiment of the present invention has been described in detail with reference to the accompanying drawings, it is to be understood that the present invention is not limited to that precise embodiment. Various changes and modifications may be effected therein by one skilled in the art without departing from the scope or spirit of the invention.

What is claimed is:

[1. A computer having floppy disk drive device for recording and reproducing information on a disk in a disk cartridge, the disk having a metal disk hub with a central hole and a drive hole partially offset from the central hole, said floppy disk drive comprising:

a spindle mounted so as to engage the central hole of the disk;

a spindle motor operatively coupled to said spindle, said spindle being rotatable by said spindle motor;

a rotary member fixed to said spindle and rotatable therewith;

a chucking magnet positioned to attract the metal disk hub of the disk toward said rotary member;

a chucking lever having first and second ends pivotally attached to said rotary member at essentially said first end; and a drive pin mounted at essentially said second end of said chucking lever and positioned for engagement by the drive hole of the disk when aligned therewith, wherein said chucking lever being formed of an elastic material so that said chucking lever may swing within a predetermined angle by the force of said chucking magnet attracting the metal disk hub of the disk to bear against said drive pin when disk chucking is not accomplished.]

[2. The computer of claim 1, wherein said rotary member is the rotor of said spindle motor.]

[3. The computer of claim 2, wherein said drive pin is formed to said chucking by a caulking lever.]

[4. An electronic appliance having floppy disk drive device for recording and reproducing information on a disk in a disk cartridge, the disk having a metal disk hub with a central hole and a drive hole partially offset from the central hole, said floppy disk drive comprising:

a spindle mounted so as to engage the central hole of the disk;

a spindle motor operatively coupled to said spindle, said spindle being rotatable thereof;

a rotary member fixed to said spindle and rotatable therewith;

a chucking magnet positioned to attract the metal disk hub of the disk toward said rotary member;

a chucking lever having first and second ends pivotally attached to said rotary member at essentially said first end; and a drive pin mounted at essentially said second end of said chucking lever and positioned for engagement by the drive hole of the disk when aligned therewith, wherein said chucking lever being formed of an elastic material so that said chucking lever may swing within a predetermined angle by the force of said chucking magnet attracting the metal disk hub of the disk to bear against said drive pin when disk chucking is not accomplished.]

[5. The electronic appliance of claim 4, wherein said rotary member is the rotor of said spindle motor.]

[6. The electronic appliance of claim 5, wherein said drive pin is formed to said chucking by a caulking lever.]

*7. A floppy disk drive for recording and reproducing information on a disk encased within a disk jacket, the disk having a metal disk hub with a central hole and a drive hole partially offset from the central hole, the floppy disk drive comprising:*

*a board;*

*a motor including a stator fixed to the board and a rotor mounted on the board, the rotor including a rotor magnet disposed in a common plane with the stator;*

*a chucking magnet disposed on the rotor;*

*a rotatable spindle fixed to the rotor so as to engage with the central hole of the disk; and*

*a drive pin movably attached to the rotor and being engageable with the drive hole of the hub.*

*8. The floppy disk drive of claim 7, wherein, within a plane parallel to the common plane, the drive pin primarily moves in directions radially towards and radially away from an axis of the spindle.*

*9. The floppy disk drive of claim 8, wherein the drive pin is movable in a direction substantially parallel to said axis of said spindle and perpendicular to an upper surface of the rotor.*

*10. The floppy disk drive of claim 9, further comprising a lever pivotably attached to the rotor, said drive pin being attached to said lever.*

*11. The floppy disk drive of claim 7, wherein an imaginary line connects an axis of said spindle and an axis of said drive pin, said drive pin moving along an arc-shaped path comprised of tangential and radial components, said drive pin primarily moving along said radial component of said arc-shaped path substantially parallel to said imaginary line.*

*12. The floppy disk drive of claim 11, wherein the drive pin is movable in a direction substantially parallel to said axis of said spindle and perpendicular to an upper surface of the rotor.*

*13. The floppy disk drive of claim 12, further comprising a lever pivotably attached to the rotor, said drive pin being attached to said lever.*

*14. The floppy disk drive of claim 7, wherein the drive pin does not move below an upper surface of the rotor.*

*15. The floppy disk drive of claim 14, further comprising a lever pivotably attached to the rotor, said drive pin being attached to said lever.*

*16. The floppy disk drive of claim 7, wherein the drive pin is movable in a direction substantially parallel to an axis of said spindle and perpendicular to an upper surface of the rotor.*

*17. The floppy disk drive of claim 16, further comprising a lever pivotably attached to the rotor, said drive pin being attached to said lever.*

*18. The floppy disk drive of claim 7, further comprising a lever that moves parallel to a surface of the rotor, said drive pin being attached to the lever near an end of the lever.*

*19. The floppy disk drive of claim 18, wherein the lever is pivotably attached to the rotor.*

*20. The floppy disk drive of claim 7, further comprising a holder that positions the disk jacket into and out of communication with the drive pin.*

*21. The floppy disk drive of claim 7, further comprising:*

*a carriage relatively movable with respect to the disk jacket;*

*at least one reading/writing head supported on the carriage, the reading/writing head communicating with the disk within the disk jacket; and*

*a speed detecting magnet extending radially away from a circumference of the rotor, only the speed detecting magnet overlapping with at least one of said reading/writing head and said carriage in a plane perpendicular to the common plane.*

*22. The floppy disk drive of claim 7, further comprising:*

*a speed detecting magnet extending radially away from a circumference of the rotor; and*

*a frame having an opening, the direct drive motor being aligned with the opening, and the speed detecting magnet having a diameter that is greater than a diameter of the opening to prevent removal of the direct drive motor through the opening.*

*23. The floppy disk drive of claim 7, wherein the drive pin moves primarily in directions radially towards and away from an axis of the spindle but not below an upper surface of the rotor.*

*24. The floppy disk drive of claim 7, wherein an engagement quantity l1 of the drive pin with the hub is set to 0.78 mm or less.*

*25. An electronic appliance including a floppy disk drive for recording and reproducing information on a disk encased within a disk jacket, the disk having a metal disk hub with a central hole and a drive hole partially offset from the central hole, the floppy disk drive comprising:*

*a board;*

*a motor including a stator fixed to the board and a rotor mounted on the board, the rotor including a rotor magnet disposed in a common plane with the stator;*

*a chucking magnet disposed on the rotor;*

*a rotatable spindle fixed to the rotor so as to engage with the central hole of the disk; and*

*a drive pin movably attached to the rotor and being engageable with the drive hole of the hub.*

*26. The electronic appliance of claim 25, wherein, within a plane parallel to the common plane, the drive pin primarily moves in directions radially towards and radially away from an axis of the spindle.*

*27. The electronic appliance of claim 26, wherein the drive pin is movable in a direction substantially parallel to said axis of said spindle and perpendicular to an upper surface of the rotor.*

*28. The electronic appliance of claim 27, further comprising a lever pivotably attached to the rotor, said drive pin being attached to said lever.*

*29. The electronic appliance of claim 25, wherein an imaginary line connects an axis of said spindle and an axis of said drive pin, said drive pin moving along an arc-shaped path comprised of tangential and radial components, said drive pin primarily moving along the radial component of said arc-shaped path substantially parallel to said imaginary line.*

*30. The electronic appliance of claim 29, wherein the drive pin is movable in a direction substantially parallel to said axis of said spindle and perpendicular to an upper surface of the rotor.*

*31. The electronic appliance of claim 30, further comprising a lever pivotably attached to the rotor, said drive pin being attached to said lever.*

*32. The electronic appliance of claim 25, wherein the drive pin does not move below an upper surface of the rotor.*

*33. The electronic appliance of claim 38, further comprising a lever pivotably attached to the rotor, said drive pin being attached to said lever.*

*34. The electronic appliance of claim 25, wherein the drive pin is movable in a direction substantially parallel to an axis of said spindle and perpendicular to an upper surface of the rotor.*

*35. The electronic appliance of claim 34, further comprising a lever pivotably attached to the rotor, said drive pin being attached to said lever.*

*36. The electronic appliance of claim 25, further comprising a lever that moves parallel to a surface of the rotor, said drive pin being attached to the lever near an end of the lever.*

*37. The electronic appliance of claim 36, wherein the lever is pivotably attached to the rotor.*

*38. The electronic appliance of claim 25, further comprising a holder that positions the disk jacket into and out of communication with the drive pin.*

*39. The electronic appliance of claim 25, further comprising:*

*a carriage relatively movable with respect to the disk jacket;*

*at least one reading/writing head supported on the carriage, the reading/writing head communicating with the disk within the disk jacket; and*

*a speed detecting magnet extending radially away from a circumference of the rotor, only the speed detecting magnet overlapping with at least one of said reading/writing head and said carriage in a plane perpendicular to the common plane.*

*40. The electronic appliance of claim 25, further comprising:*

*a speed detecting magnet extending radially away from a circumference of the rotor; and*

*a frame having an opening, the direct drive motor being aligned with the opening, and the speed detecting magnet having a diameter that is greater than a diameter of the opening to prevent removal of the disk drive motor through the opening.*

*41. The electronic appliance of claim 25, wherein the electronic appliance is a computer.*

*42. The electronic appliance of claim 25, wherein an engagement quantity l1 of the drive pin with the hub is set to 0.78 mm or less.*

*43. A floppy disk drive for recording and reproducing information on a disk encased within a disk jacket, the disk*

*having a metal disk hub with a central hole and a drive hole partially offset from the central hole, the floppy disk drive comprising:*

*a rotatable spindle for insertion through the central hole of the metal disk hub;*

*a rotary member fixed to the spindle;*

*a drive pin provided to said rotary member and extending beyond a portion of a surface of the rotary member that contacts the disk hub, said drive pin being attached to said rotary member for movement parallel to but not below said surface of said rotary member that contacts the disk hub; and*

*a chucking magnet directly attached to the rotary member, wherein the rotary member is a rotor of a motor.*

*44. The floppy disk drive of claim 43, further comprising a lever that moves parallel to said surface of the rotary member, said drive pin being attached to the lever near an end of the lever.*

*45. The floppy disk drive of claim 42, wherein the lever is pivotably attached to the rotary member.*

*46. The floppy disk drive of claim 43, further comprising a holder that positions the disk jacket into and out of communication with the drive pin.*

*47. The floppy disk drive of claim 43, further comprising:*

*a carriage relatively movable with respect to the disk jacket;*

*at least one reading/writing head supported on the carriage, the reading/writing head communicating with the disk within the disk jacket; and*

*a speed detecting magnet extending radially away from a circumference of the rotary member, only the speed detecting magnet overlapping with at least one of said reading/writing head and said carriage in a plane perpendicular to the surface of the rotary member.*

*48. The floppy disk drive of claim 43, further comprising:*

*a speed detecting magnet extending radially away from a circumference of the rotary member; and*

*a frame having an opening, the rotary member being aligned with the opening, and the speed detecting magnet having a diameter that is greater than a diameter of the opening to prevent removal of the rotary member through the opening.*

*49. The floppy disk drive of claim 43, wherein an engagement quantity l1 of the drive pin with the hub is set to 0.78 mm or less.*

*50. An electronic appliance including a floppy disk drive for recording and reproducing information on a disk encased within a disk jacket, the disk having a metal disk hub with a central hole and a drive hole partially offset from the central hole, the floppy disk drive comprising:*

*a rotatable spindle for insertion through the central hole of the metal disk hub;*

*a rotary member fixed to the spindle;*

*a drive pin provided to said rotary member and extending beyond a portion of a surface of the rotary member that contacts the disk hub, said drive pin being attached to said rotary member for movement parallel to but not below said surface of said rotary member that contacts the disk hub; and*

*a chucking magnet directly attached to the rotary member, wherein the rotary member is a rotor of a motor.*

*51. The electronic appliance of claim 50, further comprising a lever that moves parallel to said surface of the rotary member, said drive pin being attached to the lever near an end of the lever.*

*52. The electronic appliance of claim 51, wherein the lever is pivotably attached to the rotary member.*

*53. The electronic appliance of claim 50, further comprising a holder that positions the disk jacket into and out of communication with the drive pin.*

*54. The electronic appliance of claim 50, further comprising:*

*a carriage relatively movable with respect to the disk jacket;*

*at least one reading/writing head supported on the carriage, the reading/writing head communicating with the disk within the disk jacket; and*

*a speed detecting magnet extending radially away from a circumference of the rotary member, only the speed detecting magnet overlapping with at least one of said reading/writing head and said carriage in a plane perpendicular to the surface of the rotary member.*

*55. The electronic appliance of claim 50, further comprising:*

*a speed detecting magnet extending radially away from a circumference of the rotary member; and*

*a frame having an opening, the rotary member being aligned with the opening and, the speed detecting magnet having a diameter that is greater than a diameter of the opening to prevent removal of the rotary member through the opening.*

*56. The electronic appliance of claim 50, wherein an engagement quantity l1 of the drive pin with the hub is set to 0.78 mm or less.*

*57. A floppy disk drive for recording and reproducing information on a disk encased within a disk jacket, the disk having a metal disk hub with a central hole and a drive hole partially offset from the central hole, the floppy disk drive comprising:*

*a rotatable spindle for insertion through the central hole of the metal disk hub;*

*a rotary member fixed to the spindle;*

*a drive pin provided to said rotary member and extending beyond a portion of a surface of the rotary member that contacts the disk hub, said drive pin being attached to said rotary member for movement parallel to said surface of said rotary member that contacts the disk hub; and*

*a chucking magnet directly attached to the rotary member, wherein an engagement quantity l1 of the drive pin with the disk hub is set to 0.78 mm or less.*

*58. The floppy disk drive of claim 57, further comprising a lever that moves parallel to said surface of the rotary member, said drive pin being attached to the lever near an end of the lever.*

*59. The floppy disk drive of claim 58, wherein the lever is pivotably attached to the rotary member.*

*60. The floppy disk drive of claim 57, further comprising a holder that positions the disk jacket into and out of communication with the drive pin.*

*61. An electronic appliance including a floppy disk drive for recording and reproducing information on a disk encased within a disk jacket, the disk having a metal disk hub with a central hole and a drive hole partially offset from the central hole, the floppy disk drive comprising:*

*a rotatable spindle for insertion through the central hole of the metal disk hub;*

*a rotary member fixed to the spindle;*

*a drive pin provided to said rotary member and extending beyond a portion of a surface of the rotary member that contacts the disk hub, said drive pin being attached to said rotary member for movement parallel to said surface of said rotary member that contacts the disk hub; and*

*a chucking magnet directly attached to the rotary member,*

*wherein an engagement quantity l1 of the drive pin with the disk hub is set to 0.78 mm or less.*

*62. The electronic appliance of claim 61, further comprising a lever that moves parallel to said surface of the rotary member, said drive pin being attached to the lever near an end of the lever.*

*63. The electronic appliance of claim 62, wherein the lever is pivotably attached to the rotary member.*

*64. The electronic appliance of claim 61, further comprising a holder that positions the disk jacket into and out of communication with the drive pin.*

* * * * *